(12) United States Patent
Hunstable

(10) Patent No.: US 10,476,362 B2
(45) Date of Patent: Nov. 12, 2019

(54) MULTI-TUNNEL ELECTRIC MOTOR/GENERATOR SEGMENT

(71) Applicant: Linear Labs, Inc., Granbury, TX (US)

(72) Inventor: Fred E. Hunstable, Granbury, TX (US)

(73) Assignee: Linear Labs, LLC, Fort Worth, TX (US)

( * ) Notice: Subject to any disclaimer, the term of this patent is extended or adjusted under 35 U.S.C. 154(b) by 592 days.

(21) Appl. No.: 15/008,431

(22) Filed: Jan. 27, 2016

(65) Prior Publication Data

US 2016/0380496 A1    Dec. 29, 2016

Related U.S. Application Data

(60) Provisional application No. 62/185,637, filed on Jun. 28, 2015.

(51) Int. Cl.
| | |
|---|---|
| *H02K 21/26* | (2006.01) |
| *H02K 1/14* | (2006.01) |
| *H02K 21/12* | (2006.01) |
| *H02K 1/18* | (2006.01) |
| *H02K 21/14* | (2006.01) |
| *H02K 1/27* | (2006.01) |
| *H02K 16/02* | (2006.01) |

(52) U.S. Cl.
CPC ............. *H02K 21/26* (2013.01); *H02K 1/145* (2013.01); *H02K 1/18* (2013.01); *H02K 1/27* (2013.01); *H02K 16/02* (2013.01); *H02K 21/12* (2013.01); *H02K 21/14* (2013.01)

(58) Field of Classification Search
CPC ............ H02K 1/18; H02K 1/45; H02K 21/12; H02K 21/14; H02K 21/26; H02K 53/00

USPC .......................................................... 310/179
See application file for complete search history.

(56) References Cited

U.S. PATENT DOCUMENTS

| | | |
|---|---|---|
| 2,703,370 A | 3/1955 | Sverre |
| 3,300,663 A | 1/1967 | O |
| 3,469,133 A | 9/1969 | Stcherbatcheff |
| 3,895,245 A | 7/1975 | Fred |
| 3,979,619 A | 9/1976 | Whiteley |
| 4,237,396 A | 12/1980 | Blenkinsop et al. |
| 4,388,547 A | 6/1983 | Gruber |
| 4,441,043 A | 4/1984 | DeCesare |

(Continued)

FOREIGN PATENT DOCUMENTS

| | | |
|---|---|---|
| CN | 2226352 Y | 5/1996 |
| CN | 2452204 Y | 10/2001 |

(Continued)

OTHER PUBLICATIONS

International Search Report and Written of the International Searching Authority from PCT/US2013/033198, dated Aug. 8, 2014, 8 pages.

(Continued)

*Primary Examiner* — Julio C. Gonzalez
*Assistant Examiner* — Rashad H Johnson
(74) *Attorney, Agent, or Firm* — Bill R. Naifeh

(57) ABSTRACT

Disclosed are various embodiments for a motor/generator where the stator is a coil assembly and the rotor is a magnetic toroidal cylindrical tunnel or where the rotor is a coil assembly and the stator is a magnetic toroidal cylindrical tunnel, and where the magnetic toroidal cylindrical tunnel comprises magnetics having a NNSS or SSNN pole configuration.

15 Claims, 27 Drawing Sheets

(56) References Cited

U.S. PATENT DOCUMENTS

| | | |
|---|---|---|
| 4,488,075 A | 12/1984 | DeCesare |
| 4,538,086 A | 8/1985 | Marsh et al. |
| 4,547,713 A | 10/1985 | Langley et al. |
| 4,629,921 A | 12/1986 | Gavaletz |
| 4,814,651 A | 3/1989 | Elris |
| 5,004,944 A | 4/1991 | Fisher |
| 5,099,158 A | 3/1992 | Stuart et al. |
| 5,594,289 A | 1/1997 | Minato |
| 5,691,589 A | 11/1997 | Keim et al. |
| 5,886,450 A | 3/1999 | Kuehnle |
| 5,962,947 A | 10/1999 | Suzuki et al. |
| 5,977,684 A | 11/1999 | Lin |
| 6,054,834 A | 4/2000 | Ha |
| 6,093,986 A | 7/2000 | Windhorn |
| 6,104,108 A | 8/2000 | Hazelton et al. |
| 6,211,597 B1 | 4/2001 | Nakano |
| 6,388,352 B1 | 5/2002 | Huang |
| 6,531,799 B1 | 3/2003 | Miller |
| 6,664,689 B2 | 12/2003 | Rose |
| 6,664,704 B2 | 12/2003 | Calley |
| 6,774,591 B2 | 8/2004 | Arimitsu et al. |
| 6,803,691 B2 | 10/2004 | Rose |
| 6,806,607 B2 | 10/2004 | Lau |
| 6,891,299 B2 | 5/2005 | Coupart et al. |
| 6,924,574 B2 | 8/2005 | Qu et al. |
| 6,924,579 B2 | 8/2005 | Calley |
| 6,930,421 B2 | 8/2005 | Wise |
| 6,930,422 B2 | 8/2005 | Rose |
| 6,967,424 B2 | 11/2005 | Popov |
| 6,979,925 B2 | 12/2005 | Schwamm |
| 7,049,722 B2 | 5/2006 | Rose |
| 7,233,088 B2 | 6/2007 | Wise |
| 7,279,818 B1 | 10/2007 | Wise |
| 7,315,103 B2 | 1/2008 | Du et al. |
| 7,348,703 B2 | 3/2008 | Bojiuc |
| 7,378,749 B2 * | 5/2008 | Moore ............... F02C 6/18 290/2 |
| 7,554,241 B2 | 6/2009 | Rao |
| 7,732,973 B2 | 6/2010 | Bojiuc |
| 7,755,244 B2 | 7/2010 | Ley et al. |
| 7,765,905 B2 | 8/2010 | Trumper et al. |
| 7,791,242 B2 | 9/2010 | Bojiuc |
| 7,834,503 B2 | 11/2010 | Bojiuc |
| 7,898,134 B1 | 3/2011 | Shaw |
| 8,008,821 B2 | 8/2011 | Calley et al. |
| 8,063,528 B2 | 11/2011 | Toot |
| 8,074,922 B2 | 12/2011 | Bojiuc |
| 8,159,104 B1 | 4/2012 | Bojiuc |
| 8,232,695 B2 | 7/2012 | Bojiuc |
| 8,288,916 B2 | 10/2012 | Quere |
| 8,362,731 B2 | 1/2013 | Smith et al. |
| 8,400,037 B2 | 3/2013 | Wojtowicz |
| 8,415,848 B2 | 4/2013 | Calley et al. |
| 8,598,754 B2 | 12/2013 | Lacour |
| 8,912,699 B2 | 12/2014 | Kuntz |
| 9,219,962 B2 | 12/2015 | Hunstable |
| 9,419,483 B2 | 8/2016 | Hunstable |
| RE46,449 E | 6/2017 | Bojiuc |
| 9,729,016 B1 | 8/2017 | Hunstable |
| 9,825,496 B2 | 11/2017 | Hunstable |
| 10,256,680 B2 | 4/2019 | Hunstable |
| 10,263,480 B2 | 4/2019 | Hunstable |
| 10,284,029 B2 | 5/2019 | Hunstable |
| 2003/0025417 A1 | 2/2003 | Rose |
| 2004/0027022 A1 | 2/2004 | Weir |
| 2004/0061397 A1 | 4/2004 | Rose |
| 2004/0194286 A1 * | 10/2004 | Rose ............... H02K 21/12 29/596 |
| 2004/0195932 A1 | 10/2004 | Rose |
| 2004/0195933 A1 | 10/2004 | Rose |
| 2004/0232800 A1 | 11/2004 | Seguchi et al. |
| 2005/0194855 A1 | 9/2005 | Hasebe |
| 2006/0038454 A1 | 2/2006 | Bojiuc |
| 2006/0273686 A1 | 12/2006 | Edelson et al. |
| 2007/0228860 A1 | 10/2007 | Rao |
| 2008/0278019 A1 * | 11/2008 | Lu ............... H02K 1/14 310/156.32 |
| 2009/0102305 A1 | 4/2009 | Lu |
| 2009/0224627 A1 | 9/2009 | Hino et al. |
| 2009/0224628 A1 | 9/2009 | Hiwaki et al. |
| 2009/0261675 A1 | 10/2009 | Hsiao et al. |
| 2010/0164422 A1 | 7/2010 | Shu et al. |
| 2010/0289365 A1 | 11/2010 | Bando et al. |
| 2011/0187222 A1 | 8/2011 | Li et al. |
| 2012/0153763 A1 | 6/2012 | Kenji |
| 2012/0286616 A1 | 11/2012 | Li et al. |
| 2013/0249343 A1 | 9/2013 | Hunstable |
| 2014/0070651 A1 | 3/2014 | Gerfast |
| 2014/0191612 A1 | 7/2014 | Eurocopter et al. |
| 2015/0001976 A1 | 1/2015 | Hunstable |
| 2015/0137647 A1 | 5/2015 | Hunstable |
| 2015/0171694 A1 * | 6/2015 | Walsh ............... H02K 3/47 310/156.43 |
| 2016/0020652 A1 | 1/2016 | Rose |
| 2016/0094096 A1 | 3/2016 | Hunstable |
| 2017/0237325 A1 | 8/2017 | Hunstable |
| 2018/0131244 A1 | 5/2018 | Hunstable |
| 2018/0212486 A1 | 7/2018 | Hunstable |
| 2018/0278134 A1 | 9/2018 | Hunstable |
| 2018/0331593 A1 | 11/2018 | Hunstable |

FOREIGN PATENT DOCUMENTS

| | | |
|---|---|---|
| CN | 101005229 A | 7/2007 |
| CN | 102687378 A | 9/2012 |
| CN | 102761179 A | 10/2012 |
| CN | 103683768 A | 3/2014 |
| CN | 104272259 A | 1/2015 |
| CN | 104285366 A | 1/2015 |
| DE | 102010024344 A1 | 12/2011 |
| EP | 1191673 A2 | 3/2002 |
| EP | 1990894 A2 | 11/2008 |
| JP | S51-133709 | 11/1976 |
| JP | S54-92305 U | 12/1977 |
| JP | 61173658 A | 8/1986 |
| JP | S61-144782 U | 9/1986 |
| JP | 2002369473 A | 12/2002 |
| JP | 2006217771 A | 8/2006 |
| JP | 2008141853 A | 6/2008 |
| JP | 2010166741 A | 7/2010 |
| KR | 101276633 B1 | 6/2013 |
| WO | 2008096913 A1 | 8/2008 |
| WO | 2011032675 | 3/2011 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |

OTHER PUBLICATIONS

Aydin, Metin, et al., "Design and 3D Electromagnetic Field Analysis of Non-slotted and Slotted TORUS Type Axial Flux Surface Mounted Permanent Magnet Disc Machines," IEEE International Electric Machines and Drives Conference, Jun. 17-20, 2001, pp. 645-651.

Aydin, Metin, et al., "Performance Evaluation of an Axial Flux Consequent Pole PM Motor Using Finite Element Analysis," IEEE International Electric Machines and Drives Conference, vol. 3, Jun. 1-4, 2003, pp. 1682-1687.

Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.

Japanese Office Action, dated Jan. 25, 2017, regarding Japanese Patent Application No. 2015-501894.

International Search Report and Written Opinion, dated Jan. 9, 2017, by the ISA/US, re PCT/US2016/057999.

Chinese Office Action, dated Apr. 19, 2017, re CN Patent Application No. 201380022180.7.

Notice of Allowance, dated Jun. 27, 2017, by the USPTO, re U.S. Appl. No. 15/492,529.

(56) References Cited

OTHER PUBLICATIONS

Office Action, dated Jan. 6, 2017, by the USPTO, re U.S. Appl. No. 14/490,656.
Ex parte Quayle Action, dated Jun. 6, 2017, by the USPTO, re U.S. Appl. No. 14/490,656.
Office Action, dated Jul. 21, 2017, by the USPTO, re U.S. Appl. No. 15/413,228.
Office Action dated Oct. 2, 2017, by the USPTO, re U.S. Appl. No. 14/866,788.
Final Office Action, dated Mar. 9, 2018, by the USPTO, re U.S. Appl. No. 15/413,228.
International Search Report and Written Opinion, dated Mar. 15, 2018, by the ISA/RU, re PCT International Application No. PCT/US2017/049981.
Notice of Allowance, dated Mar. 29, 2018, by the USPTO, re U.S. Appl. No. 14/866,787.
Notice of Allowance, dated Apr. 13, 2018, by the USPTO, re U.S. Appl. No. 14/866,788.
Notice of Allowance, dated Oct. 16, 2017, by the USPTO, re U.S. Appl. No. 14/490,656.
Office Action, dated Nov. 6, 2017, by the USPTO, re U.S. Appl. No. 14/866,787.
International Search Report and Written Opinion of the ISA, dated Aug. 18, 2016, re PCT/US2016/026776.
International Search Report and Written Opinion, dated Nov. 3, 2016, by the ISA/RU, re PCT/US2016/039673.
Office Action, dated Aug. 25, 2015, by the USPTO, re U.S. Appl. No. 13/848,048.
Final Office Action, dated Feb. 17, 2016, by the USPTO, re U.S. Appl. No. 13/848,048.
Notice of Allowance, dated Jun. 7, 2016, by the USPTO, re U.S. Appl. No. 13/848,048.
Pre-Interview First Office Action, dated Apr. 15, 2015, by the USPTO, re U.S. Appl. No. 14/608,232.
First Action Interview—Office Action, dated Nov. 13, 2015, by the USPTO, re U.S. Appl. No. 14/608,232.
Final Office Action, dated Feb. 25, 2016, by the USPTO, re U.S. Appl. No. 14/608,232.
Notice of Allowance, dated Jun. 27, 2016, by the USPTO, re U.S. Appl. No. 14/608,232.
Notice of Allowance, dated Nov. 2, 2016, by the USPTO, re U.S. Appl. No. 14/608,232.
Australian Exam Report, dated May 10, 2016, re Patent App No. 2013235132; 3 pages.
Chinese Office Action, dated Jul. 20, 2016, re Patent App No. 201380022180.7; 9 pages.
Extended European Search Report, dated Oct. 26, 2018, by the EPO, re EP Patent App No. 16777421.5.
Notice of Allowance, dated Apr. 26, 2018, by the USPTO, re U.S. Appl. No. 14/866,787.
Notice of Allowance, dated Sep. 12, 2018, by the USPTO, re U.S. Appl. No. 14/866,787.
Notice of Allowance, dated May 2, 2018, by the USPTO, re U.S. Appl. No. 14/866,788.
Notice of Allowance, dated Aug. 13, 2018, by the USPTO, re U.S. Appl. No. 14/866,788.
Office Action, dated May 18, 2018, by the USPTO, re U.S. Appl. No. 15/657,173.
Office Action, dated Sep. 19, 2018, by the USPTO, re U.S. Appl. No. 15/413,228.
EP Exam Report, dated Apr. 18, 2018, by the EPO, re EP App No. 13714168.5.
EP Official Action, dated Nov. 13, 2018, by the EPO, re EP Patent App No. 16777421.5.
EP Exam Report, dated Oct. 10, 2018, by the EPO, re EP Patent App No. 13714168.5.
Indian Exam Report, dated Nov. 19, 2018, by IP India, re IN Patent App No. 8335/DELNP/2014.
CA Office Action, dated Jan. 24, 2019, by the CIPO, re CA Patent App No. 2,881,979.
Office Action, dated Feb. 25, 2019, by the USPTO, re U.S. Appl. No. 15/848,540.
EP Extended Search Report, dated Feb. 22, 2019, by the EPO, re EP Patent App No. 168185593.
EP Official Action, dated Mar. 12, 2019, by the EPO, re EP Patent App No. 16818559.3.
Notice of Allowance, dated Apr. 10, 2019, by the USPTO, re U.S. Appl. No. 15/413,228.
EP Extended Search Report, dated Apr. 18, 2019, by the EPO, re EP Patent App No. 16858253.4.
CN Office Action, dated Apr. 10, 2019, by the CIPO, re CN Patent App No. 201680033171.1.
EP Official Action, dated May 22, 2019, by the EPO, re EP Patent App No. 16858253.4.
Notice of Allowance, dated May 31, 2019, by the USPTO, re U.S. Appl. No. 16/374,132.
CN Office Action, dated Jun. 5, 2019, by the CIPO, re CN Patent App No. 201680050018.X.

* cited by examiner

MULTI-TUNNEL ELECTRIC MOTOR/GENERATOR SEGMENT

RELATED APPLICATIONS

This application claims the priority date from U.S. application Ser. No. 62/185,637 entitled "An Improved Electric Motor/Generator," filed on Jun. 28, 2015, the disclosure of which is incorporated by reference for all purposes.

This application is commonly owned with the following U.S. patent applications: U.S. provisional patent application Ser. No. 62/144,654 entitled "A Multi-Tunnel Electric Motor/Generator," filed on Apr. 4, 2015; U.S. provisional patent application No. "62/055,615, entitled "An Improved DC Electric Motor/Generator with Enhanced Permanent Magnetic Flux Densities," filed on Sep. 25, 2014; U.S. provisional patent application Ser. No. 62/056,389, entitled "An Improved DC Electric Motor/Generator with Enhanced Permanent Magnetic Flux Densities," filed on Sep. 26, 2014; U.S. application Ser. No. 13/848,048, entitled "An Improved DC Electric Motor/Generator with Enhanced Permanent Magnetic Flux Densities" filed on Mar. 20, 2013; which claims the benefit of U.S. Provisional Application Ser. No. 61/613,022, filed on Mar. 20, 2012, of which all of the disclosures are hereby incorporated by reference for all purposes.

TECHNICAL FIELD

The invention relates in general to a new and improved electric motor/generator, and in particular to an improved system and method for producing rotary motion from a electromagnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. The geometric shapes of the magnetic flux lines produced by moving charge carriers (electric current) are similar to the shapes of the flux lines in an electrostatic field. Magnetic flux passes through most metals with little or no effect, with certain exceptions, notably iron and nickel. These two metals, and alloys and mixtures containing them, are known as ferromagnetic materials because they may be used to concentrate magnetic lines of flux.

In a traditional electric motor, a central core of tightly wrapped current carrying material creates magnetic poles (known as the rotor) which spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Motors and generators used today produce or utilize a sinusoidal time varying voltage. This waveform is inherent to the operation of these devices.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM.

In motors or generators, some form of energy drives the rotation and/or movement of the rotor. As energy becomes more scarce and expensive, what is needed are more efficient motors and generators to reduce energy consumption, and hence costs.

SUMMARY

In response to this and other problems, there is presented various embodiments disclosed in this application, including methods and systems of increasing flux density by permanent magnet manipulation using multiple magnetic tunnels. Disclosed are various embodiments for a motor/generator comprising: a rotor adapted to rotate about a longitudinal axis, the rotor comprising a plurality of magnetic tunnels, wherein the plurality of magnets forming each magnetic tunnel substantially have poles facing inward toward the semi-circular tunnel, when a rotor/stator is positioned within the tunnel, flux lines cross the tunnel from at least two directions, the semi-circular tunnel having an entrance and an exit, wherein the magnetic field of any magnetic tunnel is of an opposite polarity to the magnetic field of an adjacent magnetic tunnel.

These and other features, and advantages, will be more clearly understood from the following detailed description taken in conjunction with the accompanying drawings.

It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without a detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims except for relative positioning.

Figure 1:
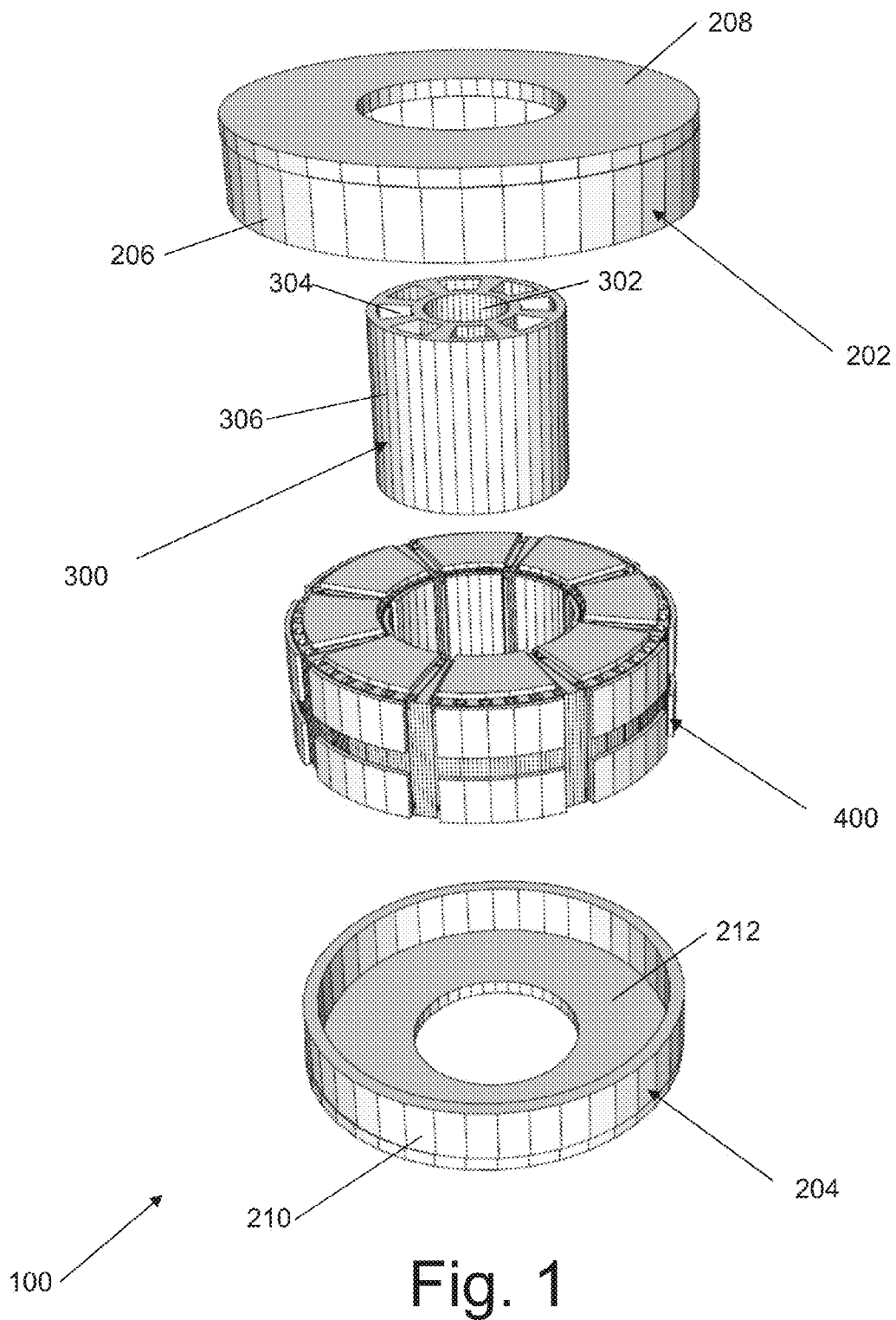
FIG. 1 is an exploded view of one embodiment of a motor/generator according to certain aspects of the present disclosure.

FIG. 1 is an exploded perspective view of a motor/generator 100 illustrating a first portion of a back iron circuit 202, a second portion of a back iron circuit 204, a center hub 300, and a magnetic disc 400. The first portion back iron circuit 202 comprises a first cylindrical wall 206 made of back iron material. The first cylinder wall 206 may be coupled to a flat side wall 208 which is also made of back iron material. For purposes of this application the term "back iron" may refer to iron or a soft magnetic material, such as any ferrous compound or alloy, such as stainless steel, any nickel or cobalt alloy, or any laminated metal comprising laminated sheets of such material.

The second portion of the back iron circuit 204 similarly comprises a second cylindrical wall 210 coupled to a flat side wall 212. Thus, when assembled the first portion of the back iron circuit 202 and the second portion of the back iron circuit 204 physically surrounds the center hub 300 and the magnetic disc 400. In other embodiments, the cylindrical walls 206 and 210 have slots (not shown) defined therein to allow the passage of control wires and/or electrical conductors. In yet other embodiments, there may be a gap (not shown) between the cylindrical walls 206 and 210 and the flat side walls 208 and 212, respectively. The gap allows for the passage of control wires and/or electrical conductors as well as heat.

In certain embodiments, the hub 300 comprises an inner hub 302 for coupling to a mechanical load transferring device, such as a shaft (not shown). The hub 300 positions and structurally supports the magnetic disc 400 about the shaft (not shown). A plurality of radial arms 304 couple the inner hub 302 to an outer hub 306. In certain embodiments, the out hub 306 also comprises a portion of the back iron circuit for the magnetic disc 400.

Figure 2:
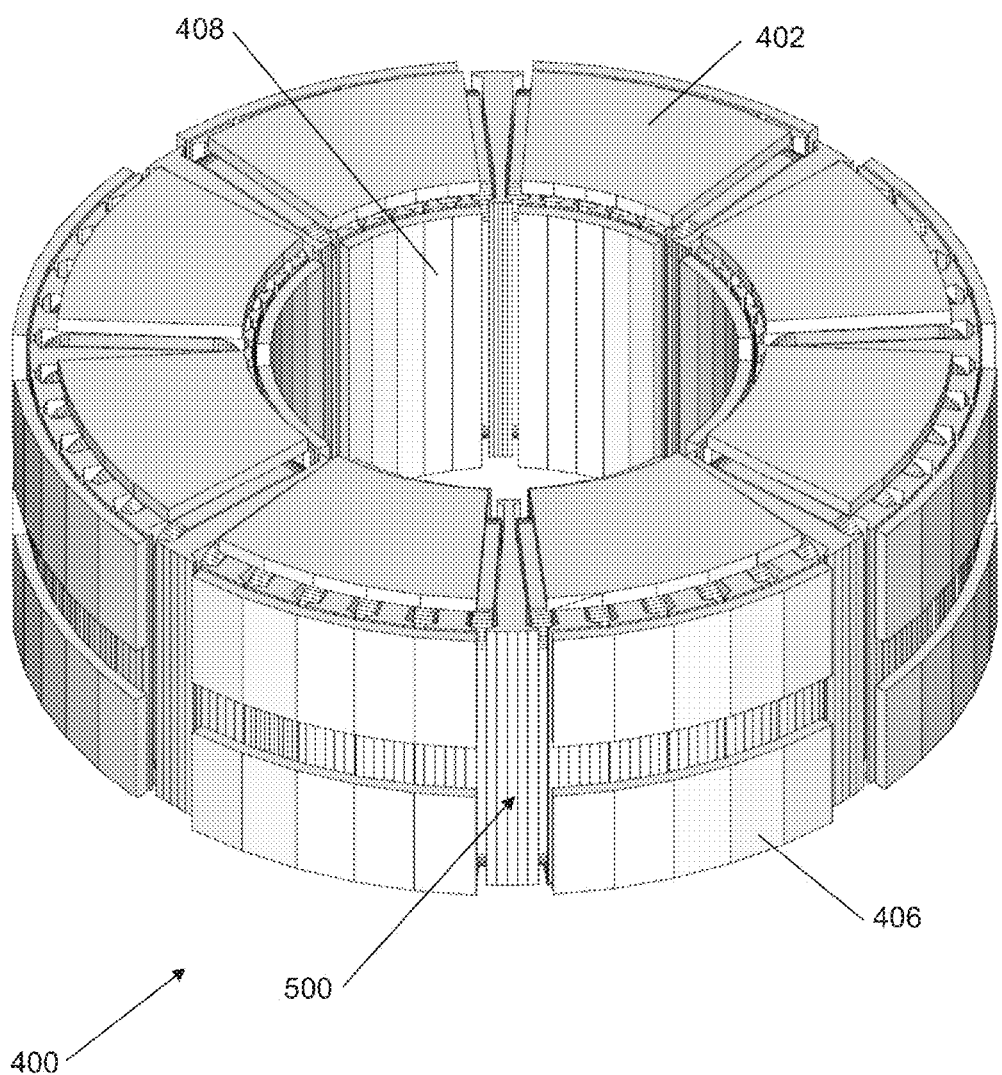
FIG. 2 is a detailed isometric view of a component of the motor/generator illustrated in FIG. 1.
Figure 3:
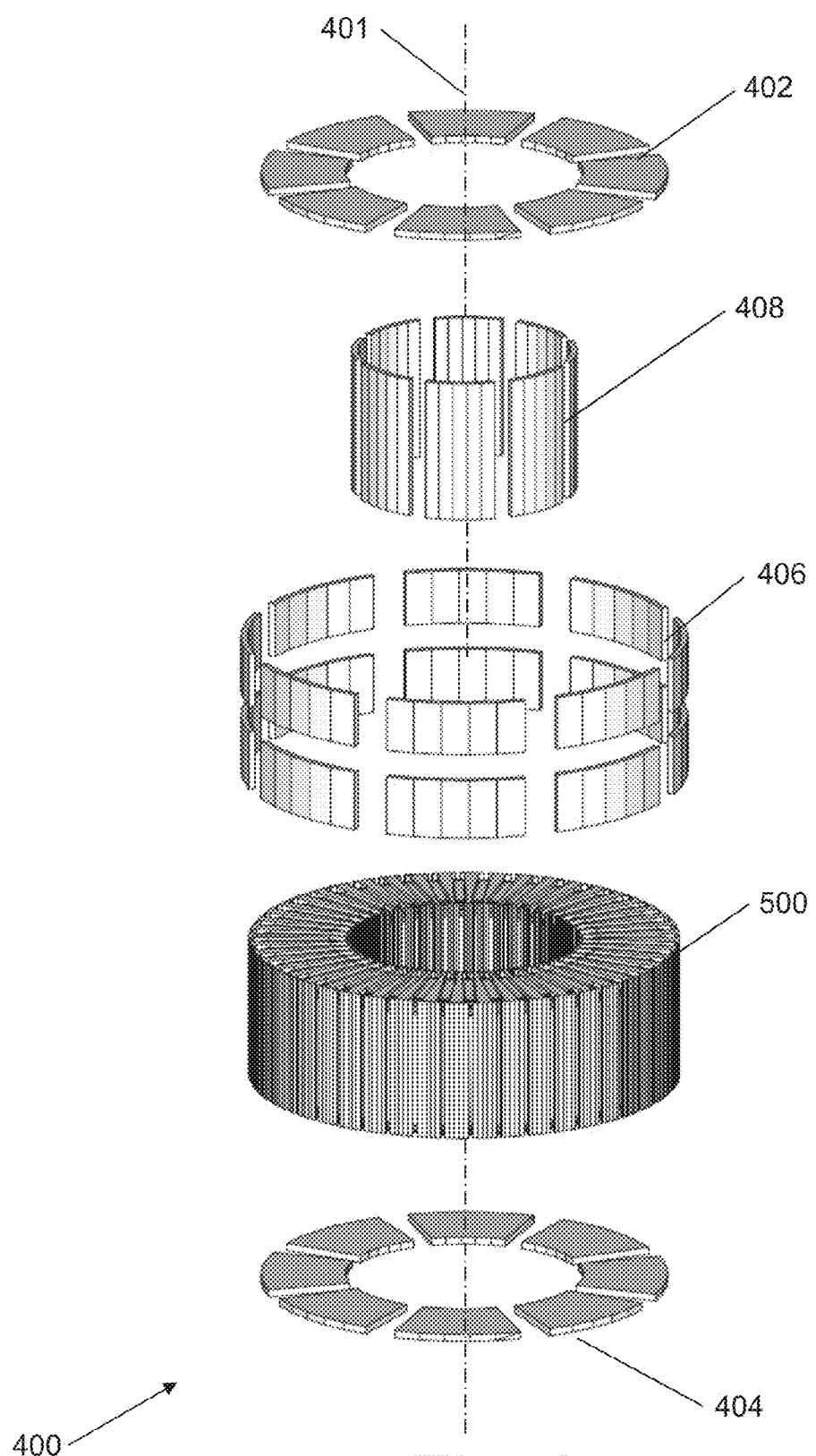
FIG. 3 is an exploded view of the component of FIG. 2.

FIG. 2 is a detailed isometric view of the magnetic disc 400. FIG. 3 is an exploded view of the magnetic disc 400. In the embodiment illustrated in FIG. 3, with respect to a longitudinal axis 401, there is a top or first side or axial ring of magnets 402. Similarly there is a bottom or second side or axial ring of magnets 404. An outer cylindrical wall or longitudinal ring of magnets 406 is longitudinally positioned between the first axial ring 402 and the second axial ring of magnets 404. An inner cylindrical wall or longitudinal ring of magnets 408 is also longitudinally positioned between the first axial ring 402 and the second axial ring of magnets 408 and laterally positioned within the outer longitudinal ring of magnets 406.

In certain embodiments, the magnets forming the axial rings 402-404 and longitudinal rings 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose.

A coil assembly 500 is laterally positioned between the outer longitudinal ring 406 and the inner longitudinal ring 408 and is longitudinally positioned between the first axial ring 402 and the second axial ring 404. In certain embodiments, the coil assembly 500 may be a stator. In yet other embodiments, the coil assembly 500 may be a rotor.

Figure 4A:
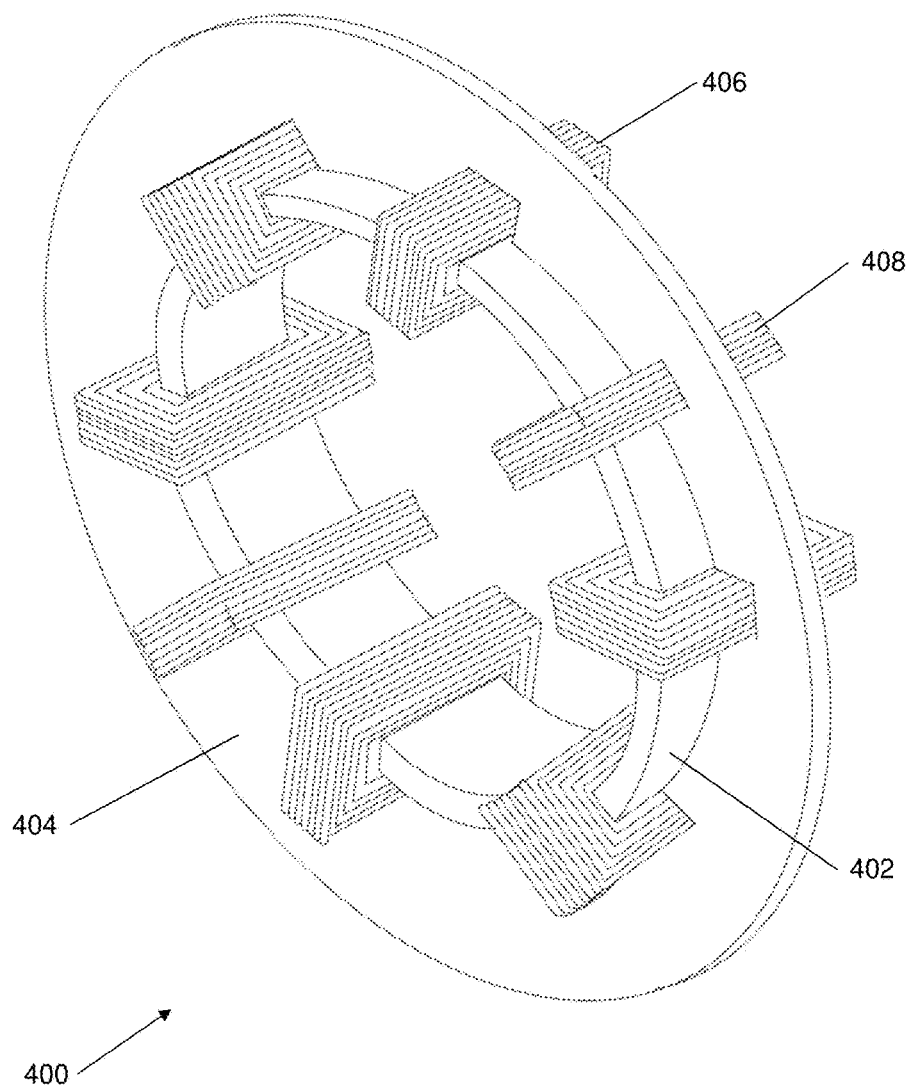
FIG. 4A is an isometric view of a coil assembly illustrating a central iron core and a plurality of teeth extending from the iron core where a portion of the teeth have been removed for clarity.

Turning now to FIG. 4A, there is a partial isometric view of a coil assembly support 502, which in one embodiment, may be a portion of a stator used in conjunction with a rotor formed by the magnetic axial rings 402-404 and magnetic longitudinal cylindrical walls 406-408 and the back iron circuit portions 202 and 204 discussed above. In certain embodiments, the coil assembly support 502 comprises a cylindrical or ring core 504 coupled to a plurality of teeth 506 radially spaced about the ring core. For purposes of clarity, FIG. 4A shows a portion of teeth 506 removed so that the ring core 504 is visible.

In certain embodiments, the ring core 504 may be made out of iron or back iron materials so that it will act as a magnetic flux force concentrator. However, other core materials maybe used when design considerations such as mechanical strength, reduction of eddy currents, cooling channels, etc. are considered. As discussed above, back iron materials may be iron, an iron alloy, laminated steel iron or other soft magnet materials. In some embodiments, the ring core 504 may be hollow or have passages defined therein to allow liquid or air cooling.

Figure 4B:
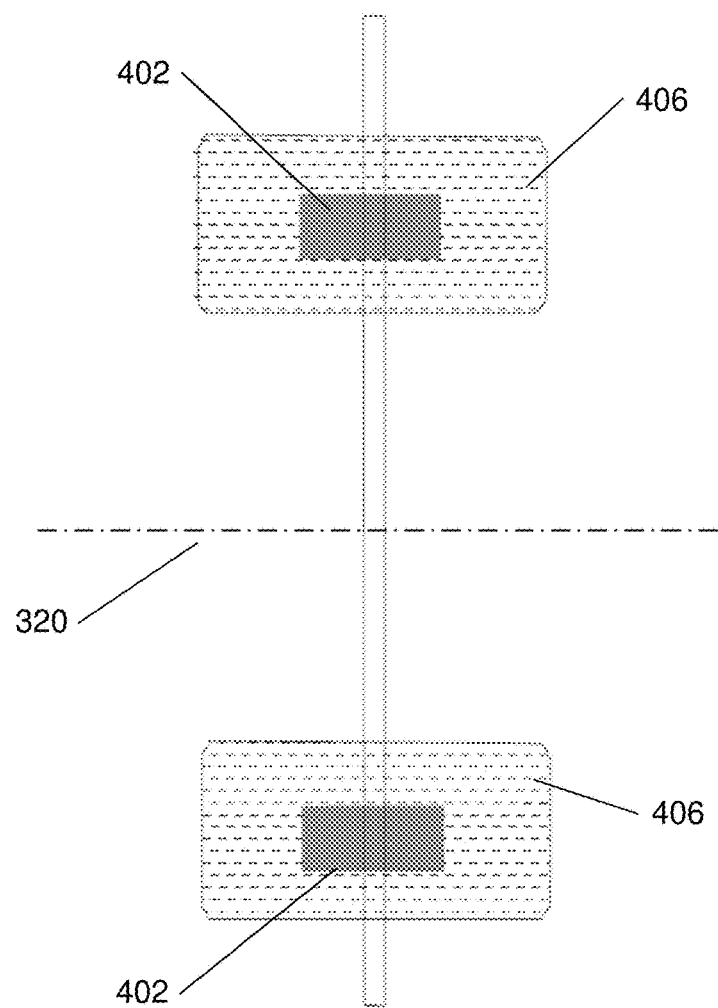
FIG. 4B is a detailed perspective view of a single tooth of the plurality of teeth of FIG. 4A.

One embodiment of an individual tooth 506a and a small portion of the ring core 504 are illustrated in FIG. 4B. The tooth 506a may be made from a material similar to the material forming the core 504, for example, iron or laminated steel. In the illustrated embodiment, each tooth 506a extends from the ring core 504 in radial (e.g., horizontal) and longitudinal (e.g., vertical) directions. Thus, each tooth 506a comprises an outer vertical portion 510 extending radially away from the longitudinal axis 401 (FIG. 3), an inner vertical portion 512 extending radially toward the longitudinal axis 401, a top horizontal portion 514 extending in one vertical longitudinal direction, and a bottom horizontal portion 516 extending in the opposing vertical or longitudinal direction. The ring core 504 is coupled to and supports the individual tooth 506a.

In certain embodiments, an exterior fin 520 couples to the exterior portion of the outer vertical member 510 and extends outward from the vertical portion 510 in both circumferential (or tangential) directions with respect to the longitudinal axis 401. Similarly, an interior fin 522 couples to an interior portion of the inner vertical portion 512 and extends outward from the vertical member 512 in both circumferential (or tangential) directions. As used in this disclosure, the term "circumferential direction" means the tangential or rotational direction about an axis, such as axis 401.

Figure 4C:
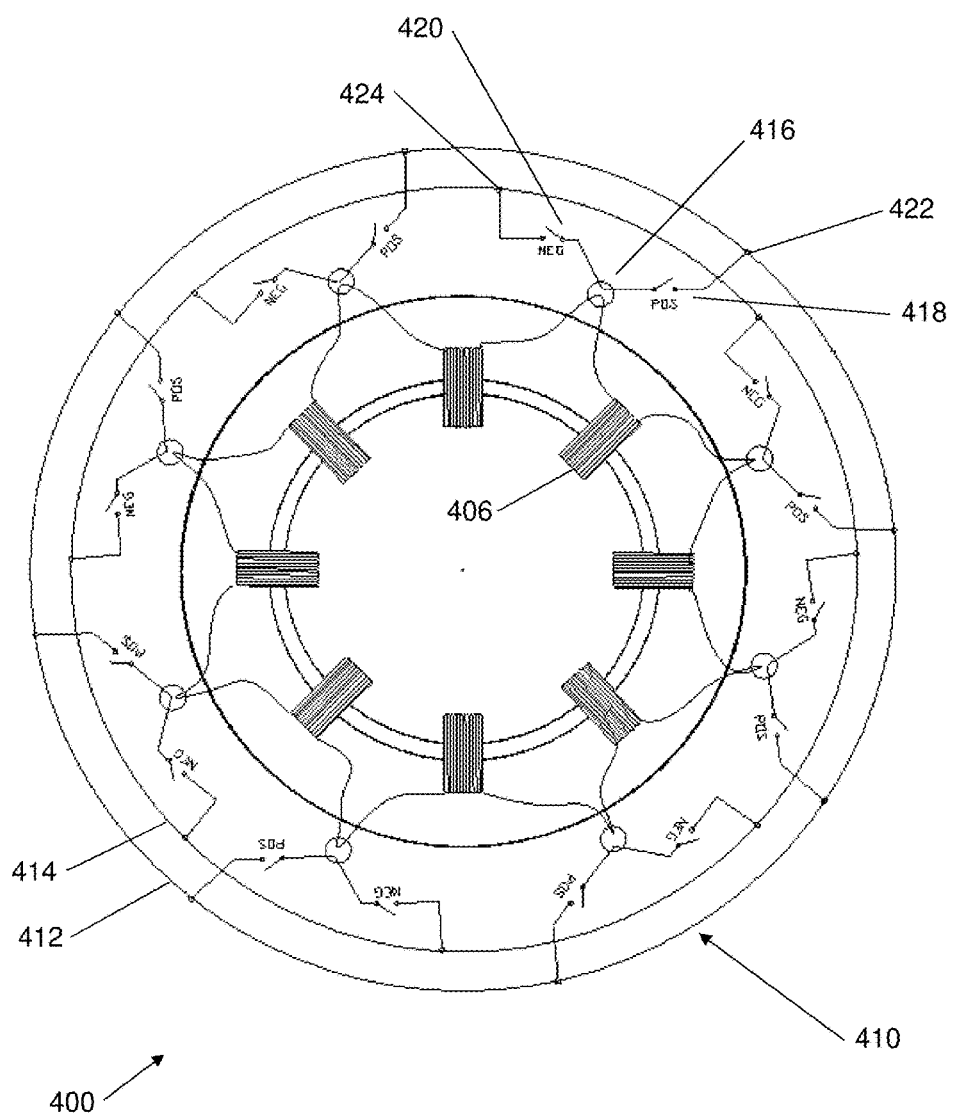
FIG. 4C is a detailed perspective view of an alternative embodiment for the single tooth of the plurality of teeth of FIG. 4A.

An alternative embodiment of an individual tooth 506'a and a small portion of the ring core 504 are illustrated in FIG. 4C. The tooth 506'a is similar to the tooth 506a described above in reference to FIG. 4B except that the tooth 506'a also has horizontal fins extending from the top horizontal portion 514 and the lower horizontal portion 516. Specifically, a top horizontal fin 518 extends in both horizontal circumferential directions from an edge of the top horizontal portion 514. Similarly, a bottom horizontal fin 519 extends in both horizontal circumferential directions from an edge of the bottom horizontal portion 516. From a structural perspective the thickness of the fins 518 and 519 maybe thicker closer to the joint with the respective horizontal members 514 and 516 and tapers as the fins extend away from the joints.

Figure 4D:
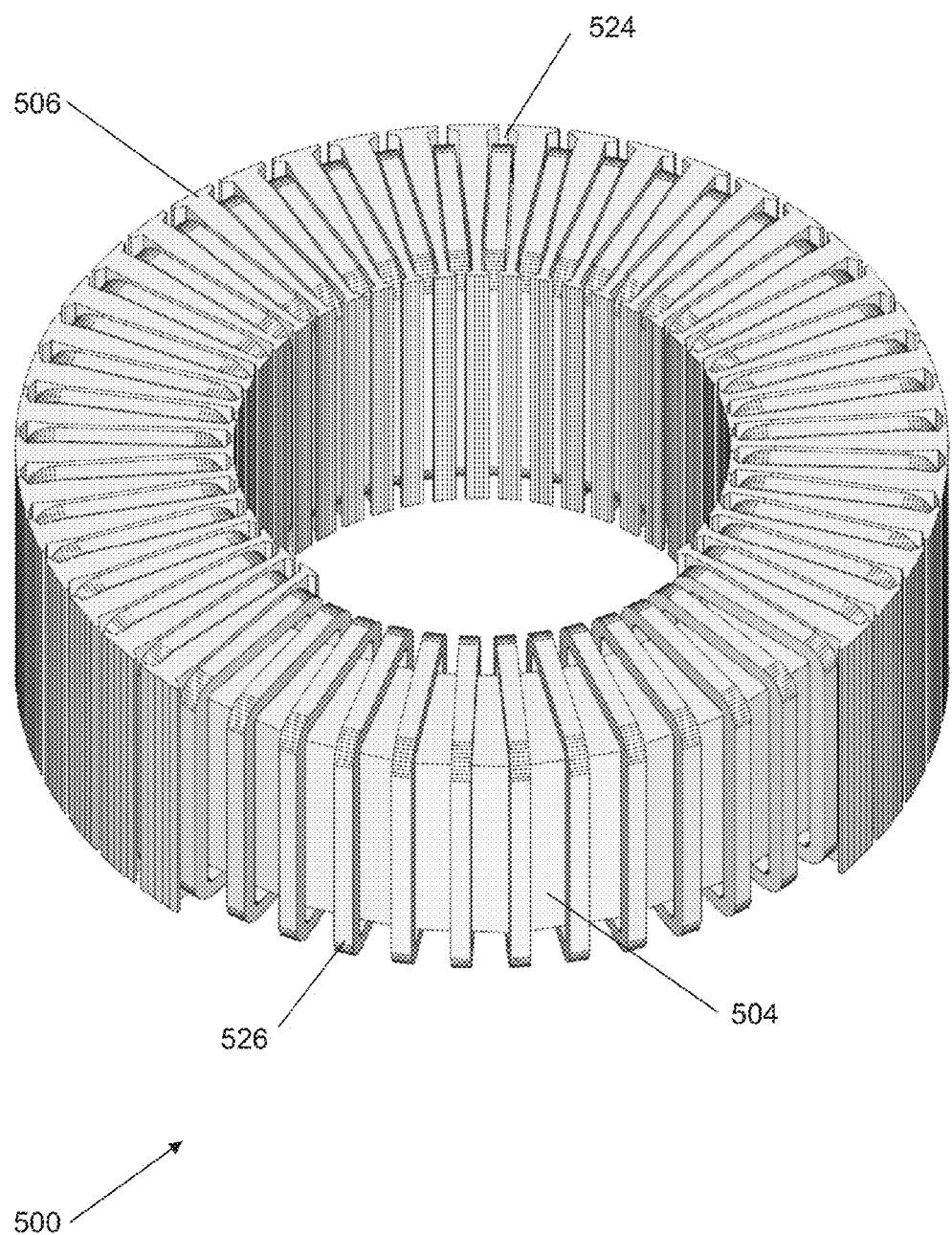
FIG. 4D is an isometric view of the coil assembly of FIG. 4A coupled to a plurality of coil windings.
Figure 4E:
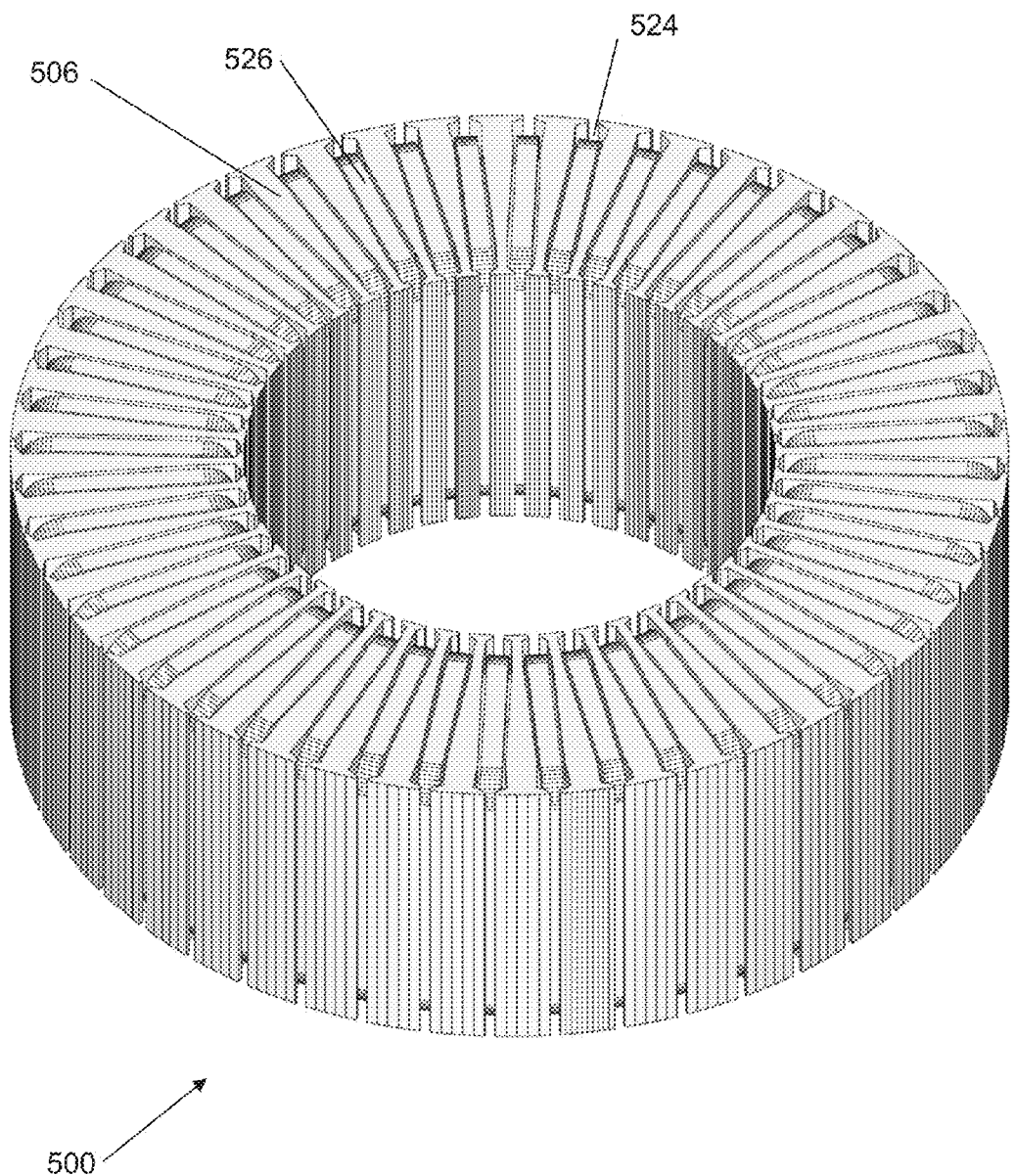
FIG. 4E is an isometric view of the rotor/stator of FIG. 4A coupled to a plurality of coil windings showing all of the rotor/stator teeth.

Adjacent teeth 506 or 506' supported by the core ring 504 form radial slots 524 within the coil assembly support structure 502, as illustrated in FIG. 4A. In contrast, FIG. 4D (which omits a portion of the teeth 506) illustrates individual coils or coil windings 526 positioned radially about the ring core 504 and within the slots 524 formed by the teeth 506 or 506'. FIG. 4E illustrates a complete coil assembly 500 showing all of the teeth 506 and coil windings 526 positioned within the slots 524.

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to be secured to the ring core.

By positioning the individual coils 526 within the slots 524 defined by the teeth 506 or 506', the coils are surrounded by a more substantial heat sink capabilities of the teeth which, in certain embodiments, can be can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator. In certain embodiments, the horizontal fins 518 and 519, the circumferential fins 520 and 522 of the teeth 506a or 506'a of the coil assembly reduce the air gap between the structure of the coil to allow flux forces to flow from one fin to an adjacent fin when the coils are energized and the coil assembly 500 begins to move relative to the magnetic tunnel. Thus, all portions of the coil support assembly 502 contribute to the overall torque developed by the system.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

Figure 5A:
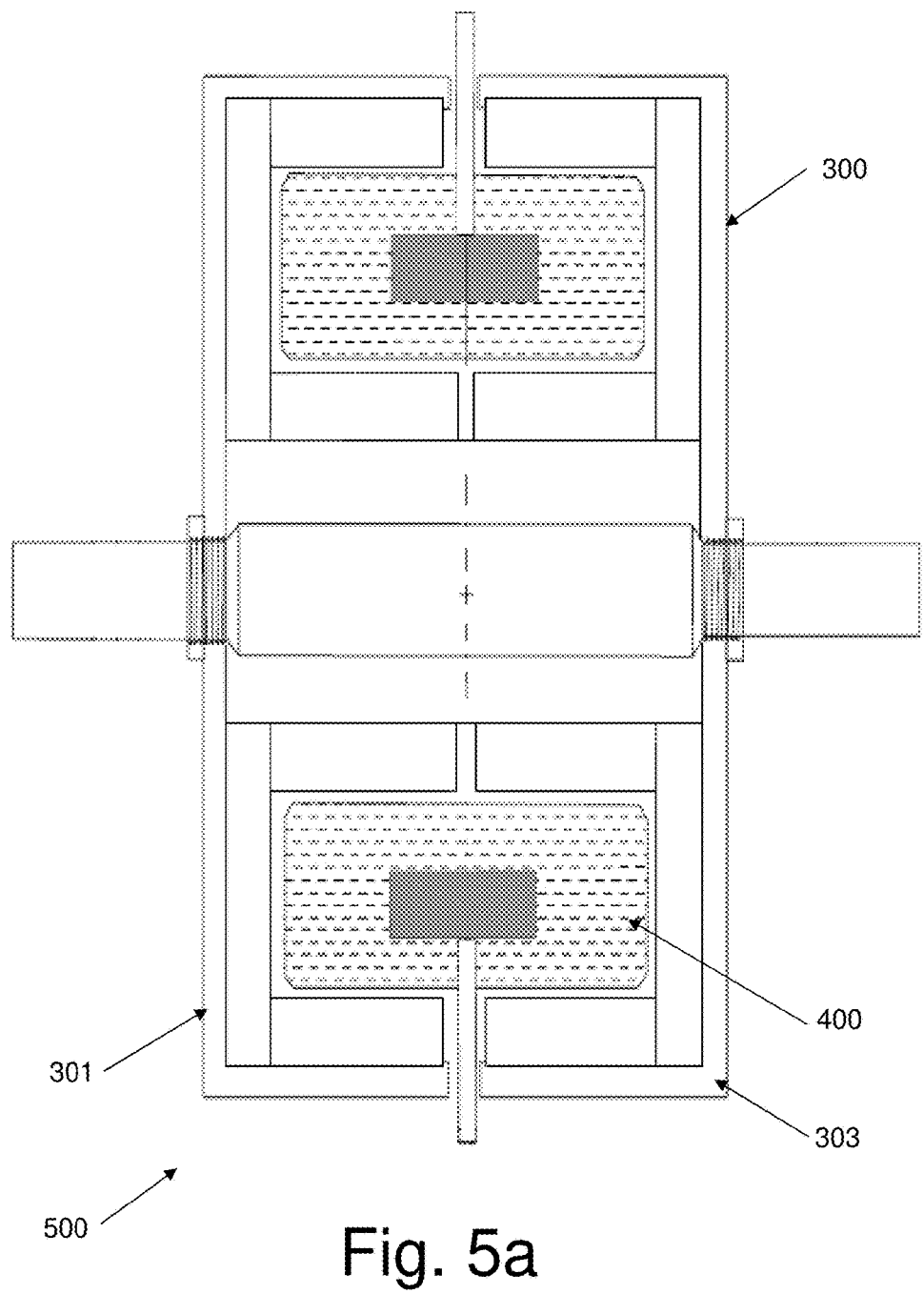
FIG. 5A illustrates a plurality of magnets forming one embodiment of a magnetic tunnel comprising eight magnetic cylinder segments.

FIG. 5A is a perspective view of a toroidal magnetic cylinder 430 forming a ring-like magnetic tunnel positioned about the longitudinal axis 401. As described previously, with respect to the longitudinal axis 401, the toroidal magnetic cylinder 430 comprises a top axial ring of side wall magnets 402. Similarly there is a second or bottom axial ring of side wall magnets 404. An outer cylindrical wall or longitudinal ring of magnets 406 is positioned longitudinally between the first axial ring 402 and the second axial ring of magnets 404. Depending on the embodiment, the outer longitudinal ring of magnets 406 may comprise an axial slot 410 to accommodate a support structure, a cooling mechanism, and/or wires and conductors. An inner cylindrical wall or longitudinal ring of magnets 408 is also longitudinally positioned between the first axial ring 402 and the second axial ring of magnets 408 and axially positioned within the outer longitudinal ring of magnets 406.

In other embodiments, the inner longitudinal ring of magnets 408 may include an axial slot (similar to slot 410, but not shown). In yet further embodiments, the first axial ring 402 or the second axial ring of magnets 404 may include a side circular slot (not shown). Such slots are designed to accommodate a support structure, a cooling mechanism and/or wires or conductors. One advantage of a slot defined within the inner longitudinal ring of magnets 408 (as opposed to the outer longitudinal ring of magnets 406) is that the inner longitudinal ring of magnets 408 produces less torque than the outer ring of magnets 406. Thus, by using the full width of the outer longitudinal ring of magnets 408, greater torque can be produced.

In the embodiment illustrated in FIG. 5A, the toroidal magnetic cylinder 430 comprises eight toroidal magnetic cylinder segments (or magnetic tunnel segments). In other embodiments, there may be two, four, six, ten, twelve segments or more. The number of segments will depend on the particular design and performance characteristics for particular application.

Figure 5B:
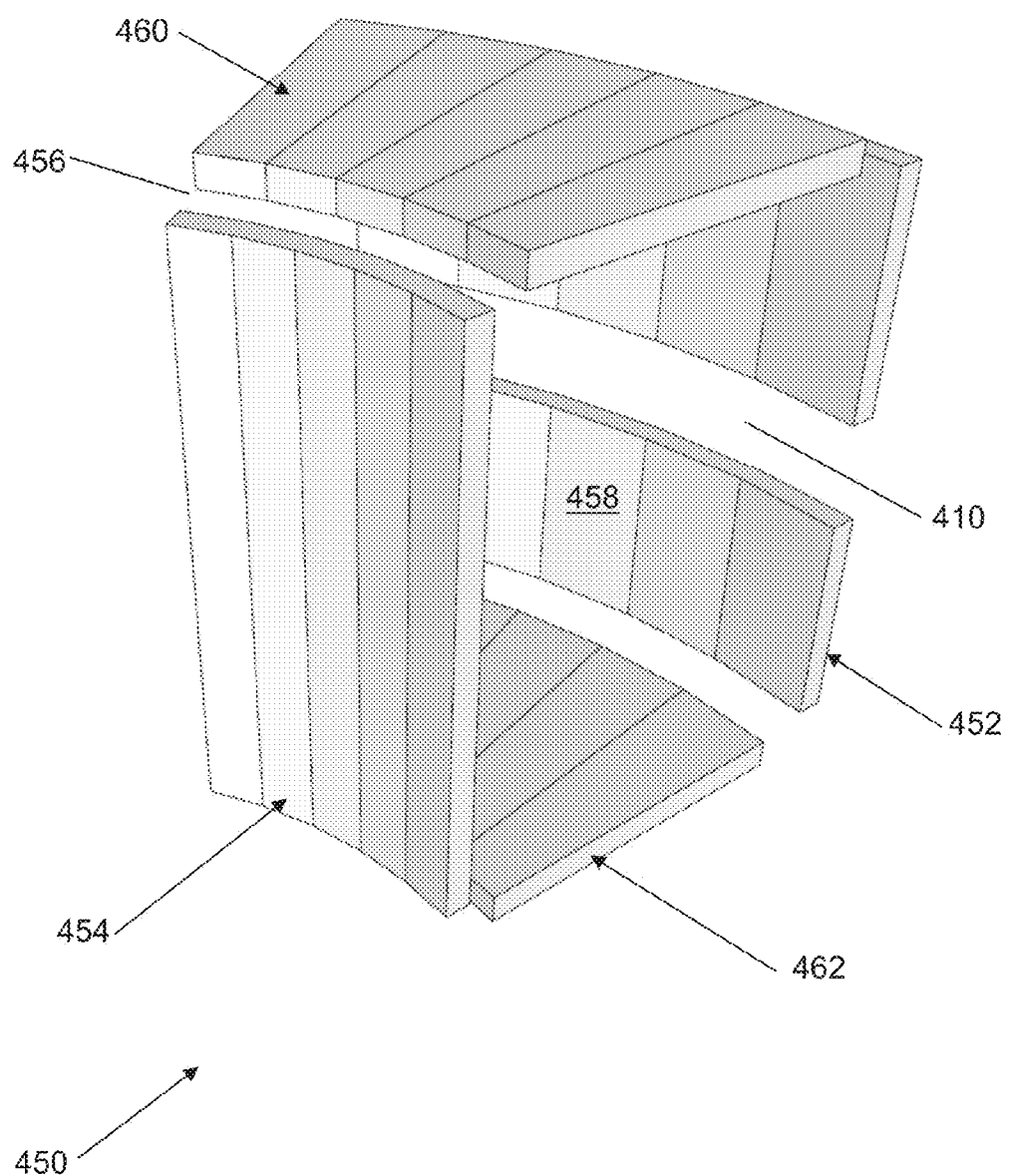
FIG. 5B is a detailed perspective view illustrating one embodiment of a magnetic cylinder segment.

FIG. 5B is a perspective view of a single toroidal magnetic cylinder segment 450 (or a magnetic tunnel segment) which defines a magnetic tunnel 458 or portion of a circular path. As illustrated, the toroidal magnetic cylinder segment 450 has an outer magnetic wall 452 (which is a portion of the outer cylinder wall 406) and an inner magnetic wall 454 (which is a portion of the inner magnetic cylinder wall 408). In addition to the partial cylindrical magnetic walls 452 and 454, there are also be magnetic axial or lateral walls 460 and 462 which in this illustrated embodiment may be made of a plurality of wedge shape members or magnets. Axial wall 460 may be a portion of the first side or ring wall 402 and axial wall 462 may be a portion of the second side or ring wall 404.

In the illustrated embodiment, there may be slots between the walls, such as slot 456 between the wall 454 and the wall 460. As discussed above, in certain embodiments, there may also be slots within the walls, such as slot 410 which is defined within the wall 452. The individual magnets in the magnetic walls 452, 454, 460, and 462 all have their magnetic poles orientated towards or away from an interior of the tunnel 458 of the toroidal magnetic cylinder segment 450 to form a "closed" magnetic tunnel segment. In other words, the magnetic poles of the magnets forming the outer wall 452 and the inner wall 454 have their magnetic poles orientated to radially point towards the longitudinal axis 401 (FIG. 5A). In contrast, the magnetic poles of the magnets forming the first axial wall 460 and the second axial wall 462 have their magnetic poles orientated parallel with the longitudinal axis 401.

The term "closed magnetic tunnel" as used in this disclosure refers to using a arrangement of the magnets forming the cylinder segment 450 that that "forces" or "bends" the flux forces from one side of the tunnel to the other (or in a circumferential direction) without letting most of the magnetic flux forces escape through a slot or other opening. Thus, the slot widths are limited to keep flux forces from exiting through the slots. In other embodiments, additional magnets may be inserted into the slots to keep the flux forces channeled to a predetermined or a circumferential direction.

Figure 5C:
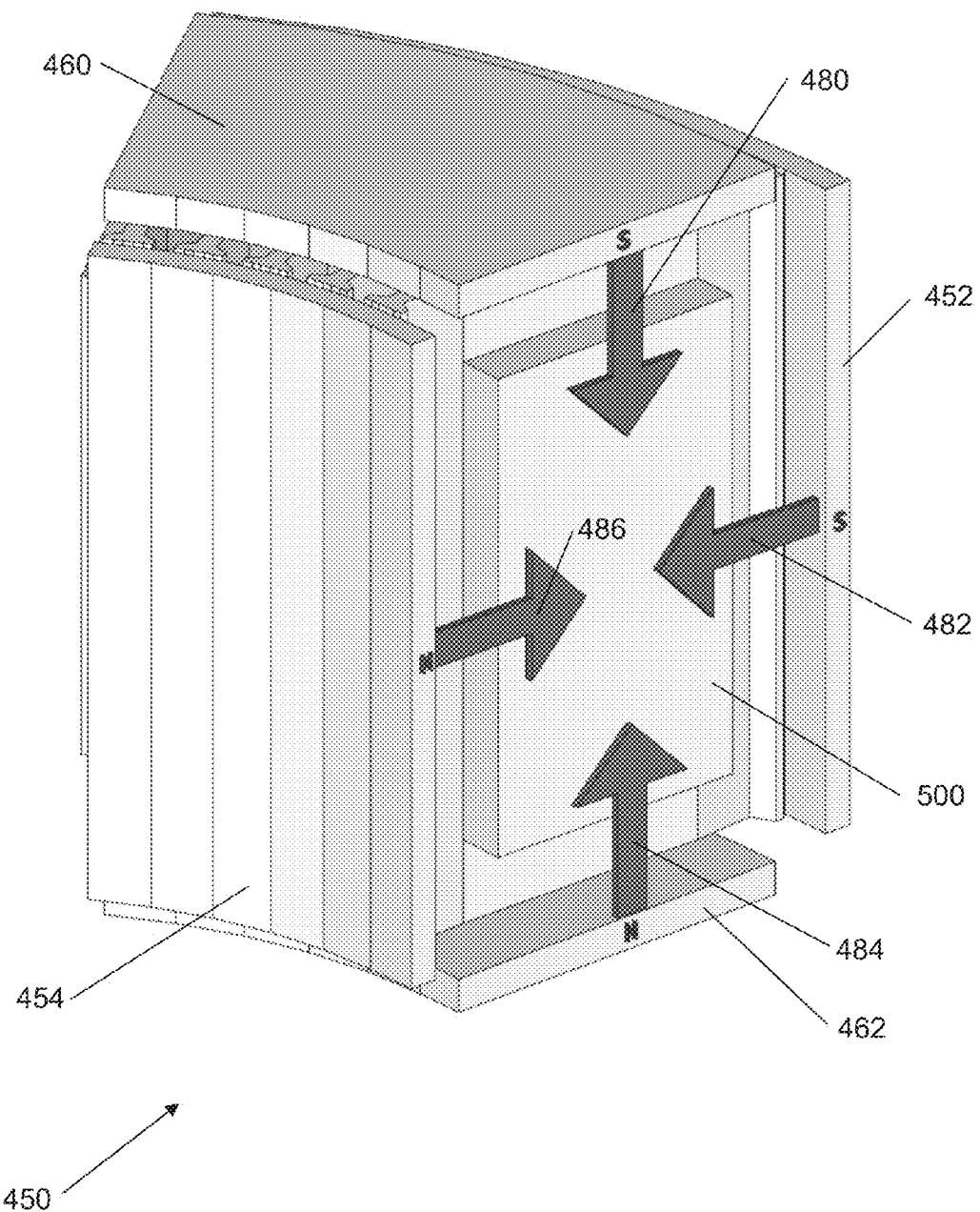
FIG. 5C is a detailed isometric view of one embodiment of a magnetic cylinder segment with a rotor/stator portion positioned therein illustrating the direction of the flux forces generated from the magnets comprising the magnetic cylinder segments.

FIG. 5C is an isometric view of the toroidal cylinder segment 450 having a portion of the coil assembly 500 positioned within the interior of the segment. In this embodiment, the magnets forming the top axial wall 460 and the outer longitudinal wall 452 have their south magnetic poles facing towards the interior of the tunnel 458. (For a matter of drawing interpretation convenience, an "S" is placed on the side of the axial wall 460 and longitudinal 452 to indicate that their south poles are facing inward.) In contrast, the magnets forming the inner longitudinal wall 454 and the bottom axial wall 462 have their north magnetic poles facing towards the interior of the tunnel 458 (Thus, an "N" is placed on the side of the axial wall 462 and longitudinal 454 to indicate that their north poles are facing inward.). When the coil assembly is positioned within the toroidal cylinder segment 450 as illustrated, the flux lines tend to flow from the north poles of the magnetic walls directly across the coil assembly to the south poles on the opposing side of the magnetic walls.

To illustrate, the top axial wall 460 is labeled with an "S" on its side face and an arrow 480 pointing towards the center of the toroidal segment 450 to represent the direction of the flux forces generated from the south poles of the magnet(s) forming the top axial wall 460. Similarly, the outer longitudinal wall 452 is labeled with an "S" on its side face and an arrow 482 pointing towards the center of the toroidal segment 450 to represent the direction of the flux forces generated from the south poles of the magnet(s) forming the outer longitudinal wall 452. In contrast, the bottom axial wall 462 is labeled with an "N" on its side face and an arrow 484 pointing towards the center of the toroidal segment 450 to represent the direction of the flux forces generated from the north poles of the magnet(s) forming the bottom axial wall 462. The inner longitudinal wall 454 is labeled with an "N" on its side face and an arrow 486 pointing towards the center of the toroidal segment 450 to represent the direction of the flux forces generated from the north poles of the magnet(s) forming the inner longitudinal wall 454.

Figure 5D:
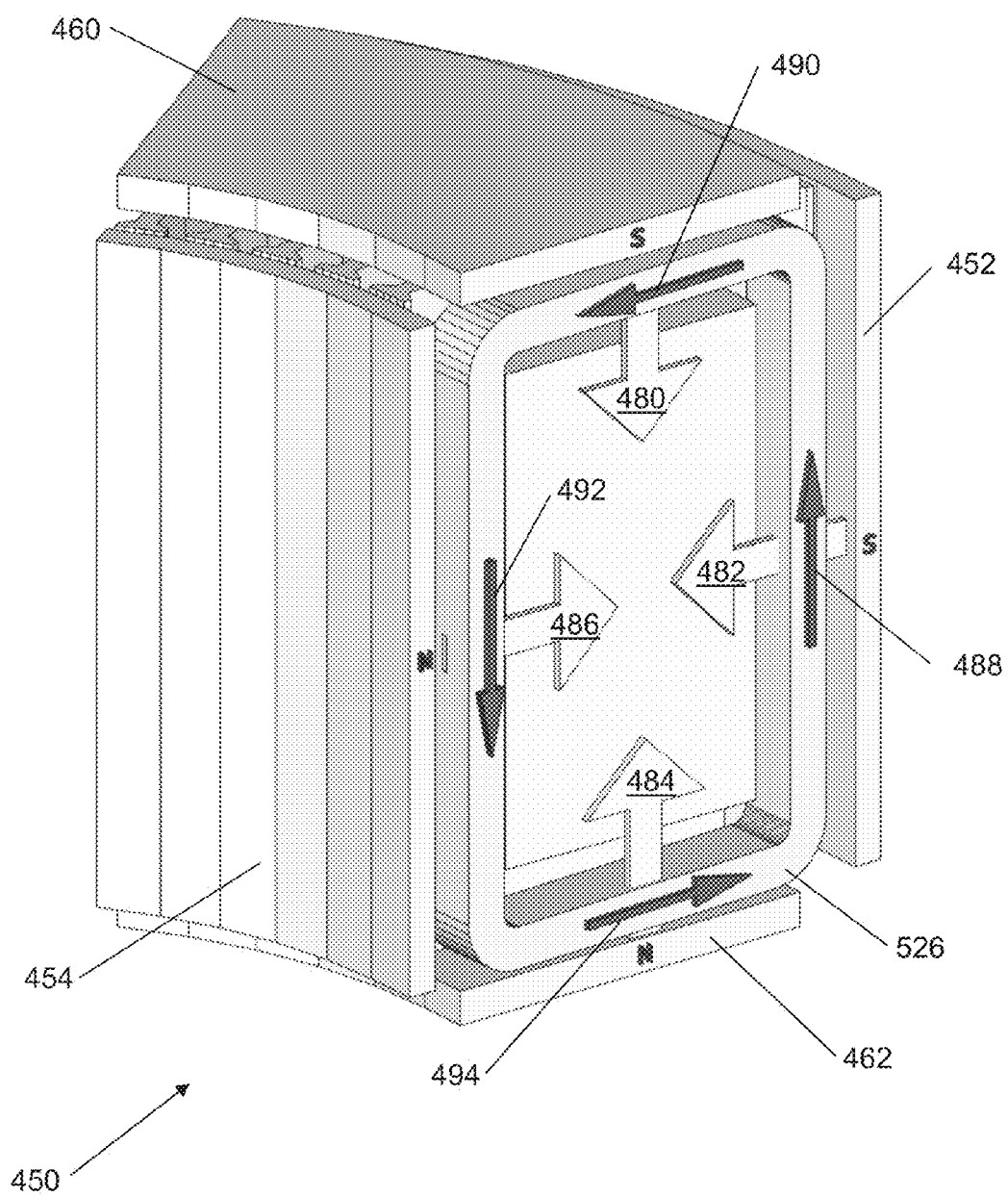
FIG. 5D is a detailed isometric view of one embodiment of a magnetic cylinder segment with a rotor/stator portion and a coil winding positioned therein illustrating the direction of the flux forces generated from the magnets and the direction of the current in the coil winding.

FIG. 5D is an isometric view of the toroidal cylinder segment 450 but with a coil 526 positioned around the portion of the coil assembly 500. When the motor/generator 100 is in motor mode, current from an external source (not shown) is applied to the coils, such as coil 526. In the illustrated embodiment, the current flows in a counterclockwise manner as illustrated by the arrow 488 which illustrates the current in the coil 526 flowing in an upwards direction. The current then flows in a right to left manner as illustrated by the arrow 490 when the current is in the upper portion of the coil 526. Similarly, the current flows in a downwardly direction as illustrated by arrow 492 when the current is in a vertical leg of the coil 526. Finally, the current flows in a left to right manner when the current is in the lower portion of the coil 526 as illustrated by the arrow 494.

Figure 5E:
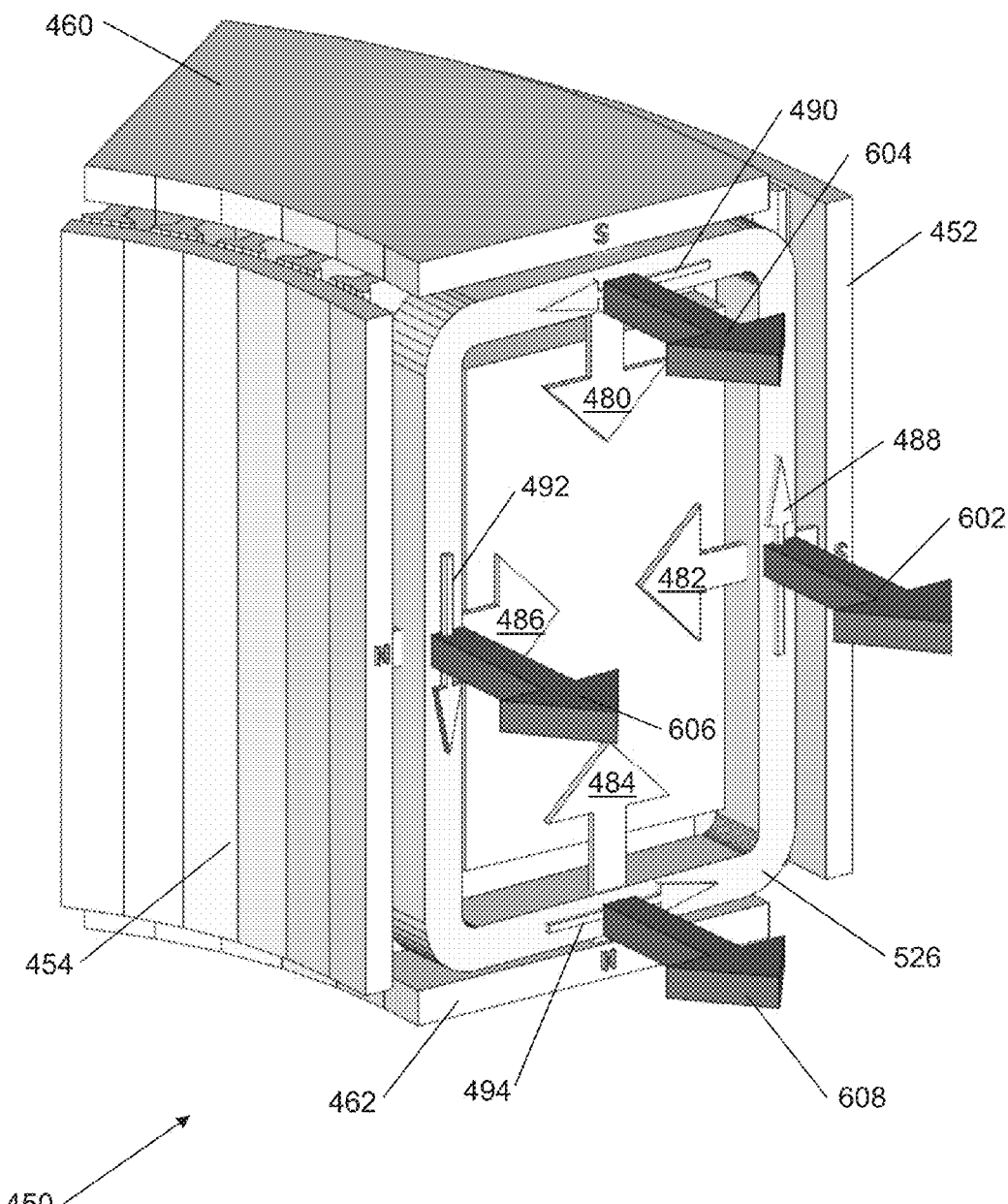
FIG. 5E is a detailed isometric view of one embodiment of a magnetic cylinder segment of FIG. 5D illustrating the direction of force generated by the interaction of the flux forces generated by the magnets and the current in the windings.

FIG. 5E is an isometric view of the cylinder segment 450 with the coil 526 positioned around the portion of the ring core 504 of the coil assembly 500 and the current flowing through the coil as explained above in reference to FIG. 5D. When the magnets forming the outer cylindrical wall 452 generate a flux force in the direction of the arrow 482 and the current in the coil 526 flows in an upward direction relative to the illustration, a magnetic force will be generated in the direction of the arrow 602 according to the right hand rule of magnetic force. Simultaneously, the magnets forming the lateral or top wall 460 generate a flux in the direction of the arrow 480 and the current in the coil 526 flows in a right-to-left direction relative to the illustration, a magnetic force will be generated in the direction of the arrow 604. Additionally, the magnets forming the longitudinal or inner cylindrical wall 454 generate a flux force in the direction of the arrow 486 and the current in the coil 526 flows in a downward direction relative to the illustration, a magnetic force will be generated in the direction of the arrow 606. Similarly, the magnets forming the lateral or bottom wall 462 generate a flux force in the direction of the arrow 484 and the current in the coil 526 flows in a left-to-right direction relative to the illustration, a magnetic force will be generated in the direction of the arrow 608.

Thus, the entire coil is used to generate the magnetic forces which will move the coil 526 relative to the cylinder segment 450.

In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles radially or perpendicular to the coil assembly 500 the magnetic flux forces flow from the surface of the magnets across the coil assembly. This configuration allows for greater tolerances between coils and magnetic surfaces.

One of the advantages of this configuration over conventional motors is that the end turns (in this case the radial section of the coils) are part of the "active section" of the invention. In conventional motors, the axial length of the copper conductor is the section that produces power. In conventional motors, the end turns are a penalty, adding weight and losses, but not producing power because the end region fields are not effectively linking the end windings. However, as can be seen, the entire coil winding is effectively producing torque due to the side wall or axial magnets which are axially magnetized. Therefore, essentially the entire conductor of the coils is active producing a greater force.

The windings of each coil 526 are generally configured such that they remain transverse or perpendicular to the direction of the relative movement of the magnets comprising the coil assembly 500 and parallel with the longitudinal axis 401. In other words, the coil windings are positioned such that their sides are parallel with the longitudinal axis and their ends are radially perpendicular to the longitudinal axis. The windings are also transverse with respect to the magnetic flux produced by the individual magnets of the rotor at their interior face as described above. Consequently, the entire coil winding or windings (including end turns) may be used to generate movement (in motor mode) or voltage (in generator mode).

Figure 6A:
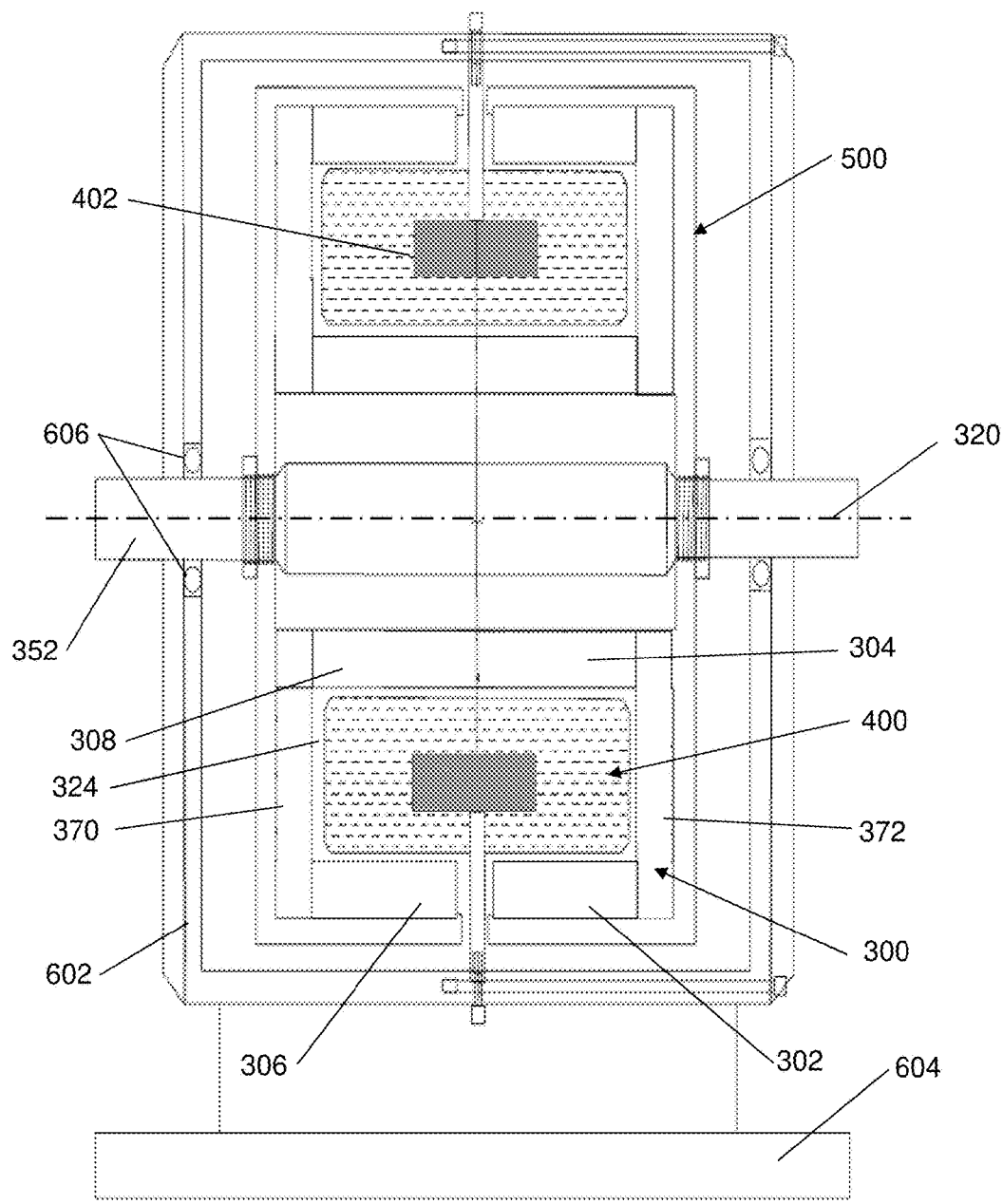
FIG. 6A is a perspective view of four magnetic cylinder segments arranged around a longitudinal axis having similar magnetic pole orientations.

FIG. 6A illustrates four partial toroidal magnetic cylinders 450a, 450b, 450c and 450d arranged circumferentially around a common center or longitudinal axis 401. This arrangement leaves four open spaces 610a, 610b, 610c, and 610d between the respective cylinder segments.

Figure 6B:
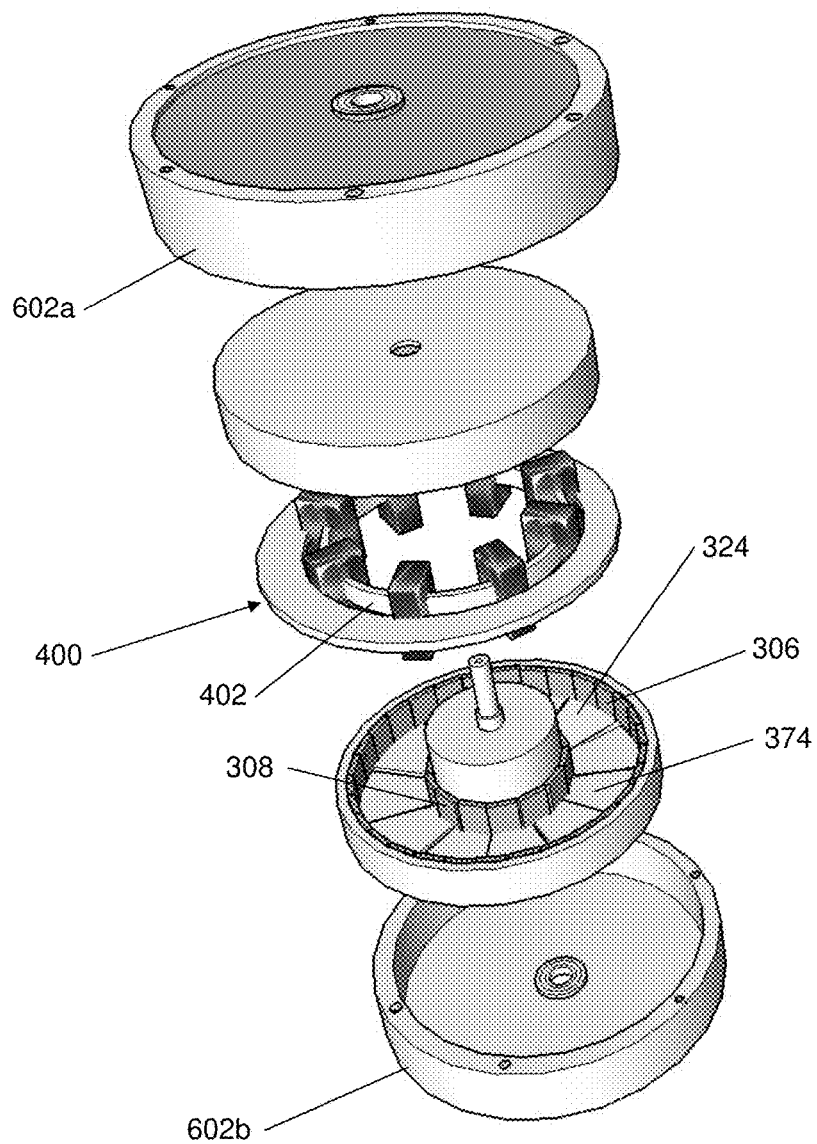
FIG. 6B is a detailed isometric view of one embodiment of a magnetic cylinder segment illustrating the magnets forming the segment have an opposite magnetic polarity to the magnets of the segment illustrated in FIG. 5C.
Figure 6C:
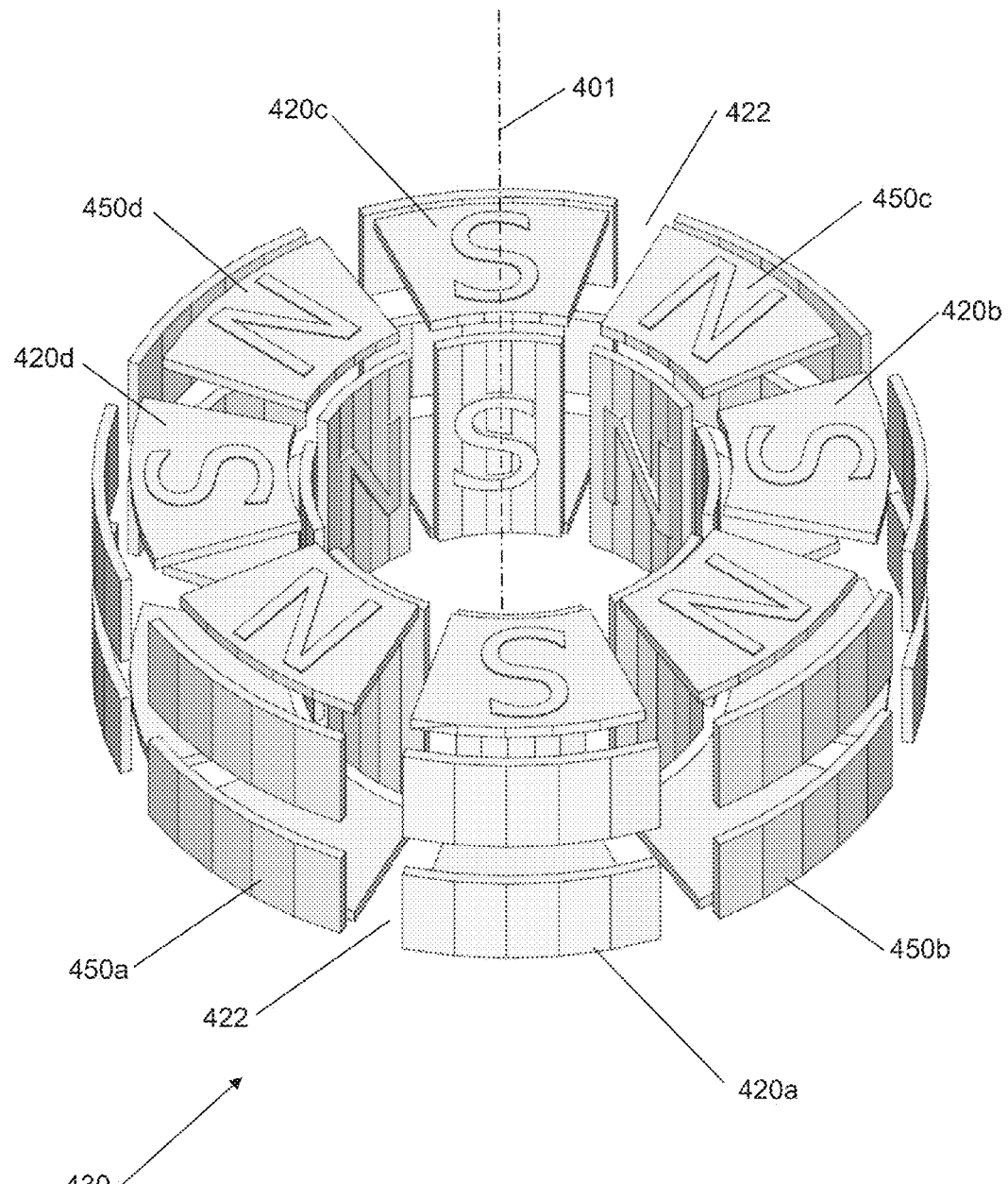
FIG. 6C is an isometric view of the four magnetic cylinder segments with four additional magnetic cylinder segments where the four additional magnetic cylinder segments have a magnetic pole orientation opposite to the first four magnetic cylinder segments.

In this embodiments, inserting or positioning four additional four toroidal magnetic cylinder segments 420a-420d into the spaces 610a-610d results in a complete toroidal magnetic cylinder 430 as illustrated in FIG. 6C. Thus, FIG. 6C illustrates the complete toroidal magnetic cylinder 430 formed from combining the four toroidal magnetic cylinder segments 450a-450d with the toroidal magnetic cylinder segments 420a-420d in an alternating arrangement around the longitudinal axis 401.

The magnets creating the toroidal magnetic cylinder segments 450a-450d are orientated in a specific geometric arrangement as discussed above in reference to FIG. 5E. In other words, the magnets forming the top magnetic walls 460 and outer cylinder wall 452 have their south poles facing inward towards the interior of the cylinder segment. The magnets forming the magnetic bottom wall 462 and the interior cylindrical wall 460 have their north poles facing inward towards the interior of the magnetic cylinder segment. In contrast, the adjacent toroidal magnetic cylinder segments such as the magnetic cylinder segment 420a have their magnetic poles orientated in the opposite direction.

As illustrated in FIG. 6B, the magnets forming the magnetic walls 460a and 452a have their north poles facing inward towards the interior of the cylinder segment. (As before, "N" is placed on the side of the axial wall 460a and longitudinal 452a to indicate that their north poles are facing inward.) The magnets forming the magnetic walls 462a and 454a have their south poles facing inward towards the interior of the magnetic cylinder segment. (Similarly, an "S" is placed on the side of the axial wall 462a and longitudinal 454a to indicate that their south poles are facing inward.) Thus, the toroidal magnetic cylinder segments 420a-420d have an opposite magnetic orientation relative to the toroidal magnetic cylinder segments 450a-450d.

When the cylinder segments 420a-420d are energized, the current running through the coil windings positioned within the toroidal magnetic cylinder segments 420a-420d also runs in an opposite direction than the current running through the coil windings positioned within the magnetic cylinder segments 450a-450d so that the direction of the generated magnetic force or torque is the same throughout the entire magnetic cylinder 430.

FIG. 6C illustrates the entire toroidal magnetic cylinder 430 where the toroidal magnetic cylinder segments 450a-450d are alternated between the toroidal magnetic cylinder segments 420a-420d. For sake of illustration, some of magnetic walls are labeled with an "S" representing a facing "South" pole of a magnet wall—as opposed to the magnetic walls labeled with an "N" representing a facing "North" pole of the magnetic wall. Thus, the letters "N" and "S" are superimposed on the exterior faces of the magnetic walls to indicate the direction of magnetic pole polarity of the magnets forming the respective wall. As discussed above, although an eight segment toroidal magnetic cylinder 430 is illustrated in FIG. 6C, in other embodiments, two, three, four, six, ten, etc. partial toroidal magnetic cylinders may be used. The number of partial toroidal magnetic cylinders selected for any given application may be based on engineering design parameters and the particular performance characteristics for an individual application. The scope of this invention specifically includes and contemplates multiple partial toroidal magnetic cylinders having an opposite polarity to the adjacent partial toroidal magnetic cylinders. For simplicity and illustrative purposes, an eight segment toroidal magnetic cylinder is described herein. However, this design choice is in no way meant to limit the choice or number of tunnels for any multi-tunnel toroidal magnetic cylinder.

In certain embodiments, the partial toroidal magnetic cylinders 450a-450d and 420a-420d may be sized to allow radial gaps 422 to form when the partial toroidal magnetic cylinders are assembled into the complete cylinder 430 as illustrated in FIG. 6C.

Figure 7A:
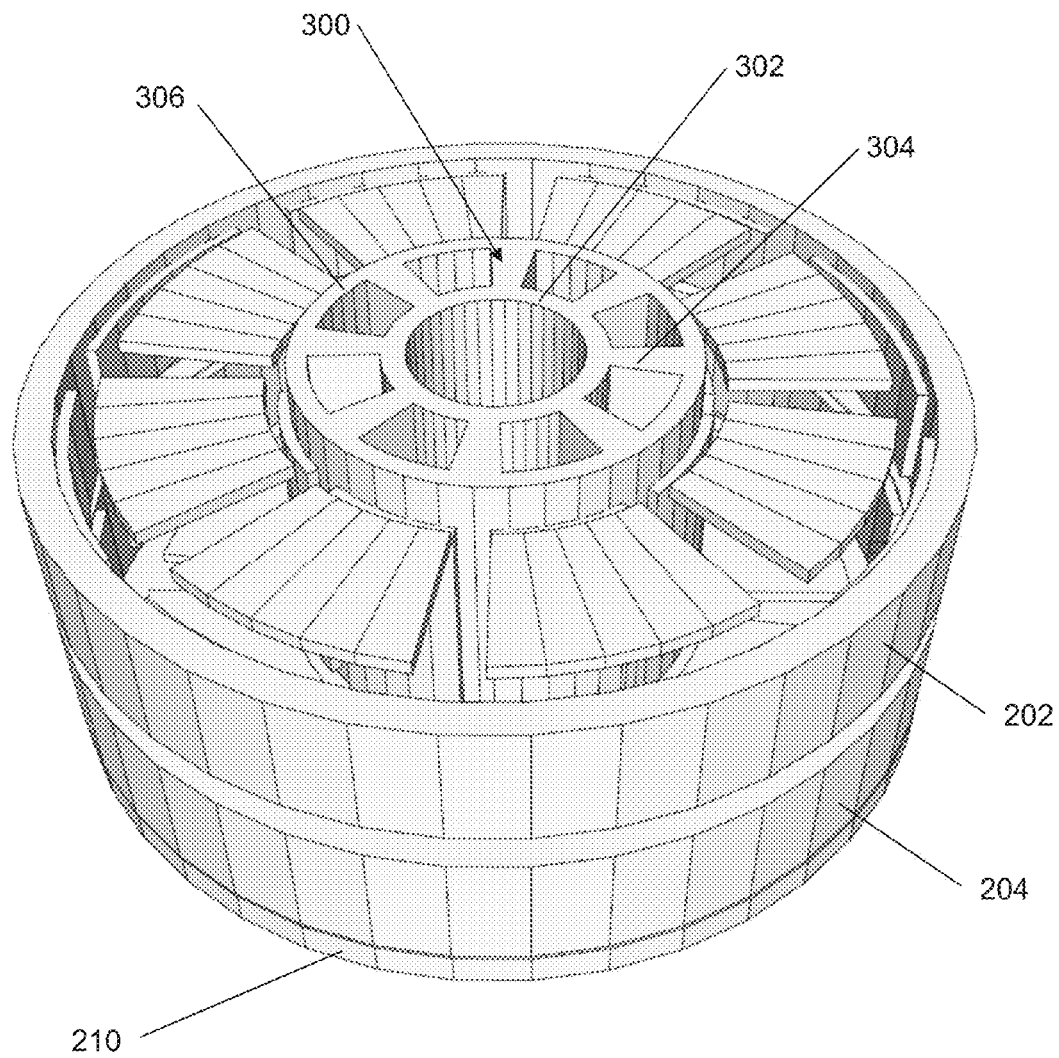
FIG. 7A illustrates the magnetic cylinder of FIG. 6C coupled to a back iron circuit with a portion of the side back iron circuit removed fro clarity.
Figure 7B:
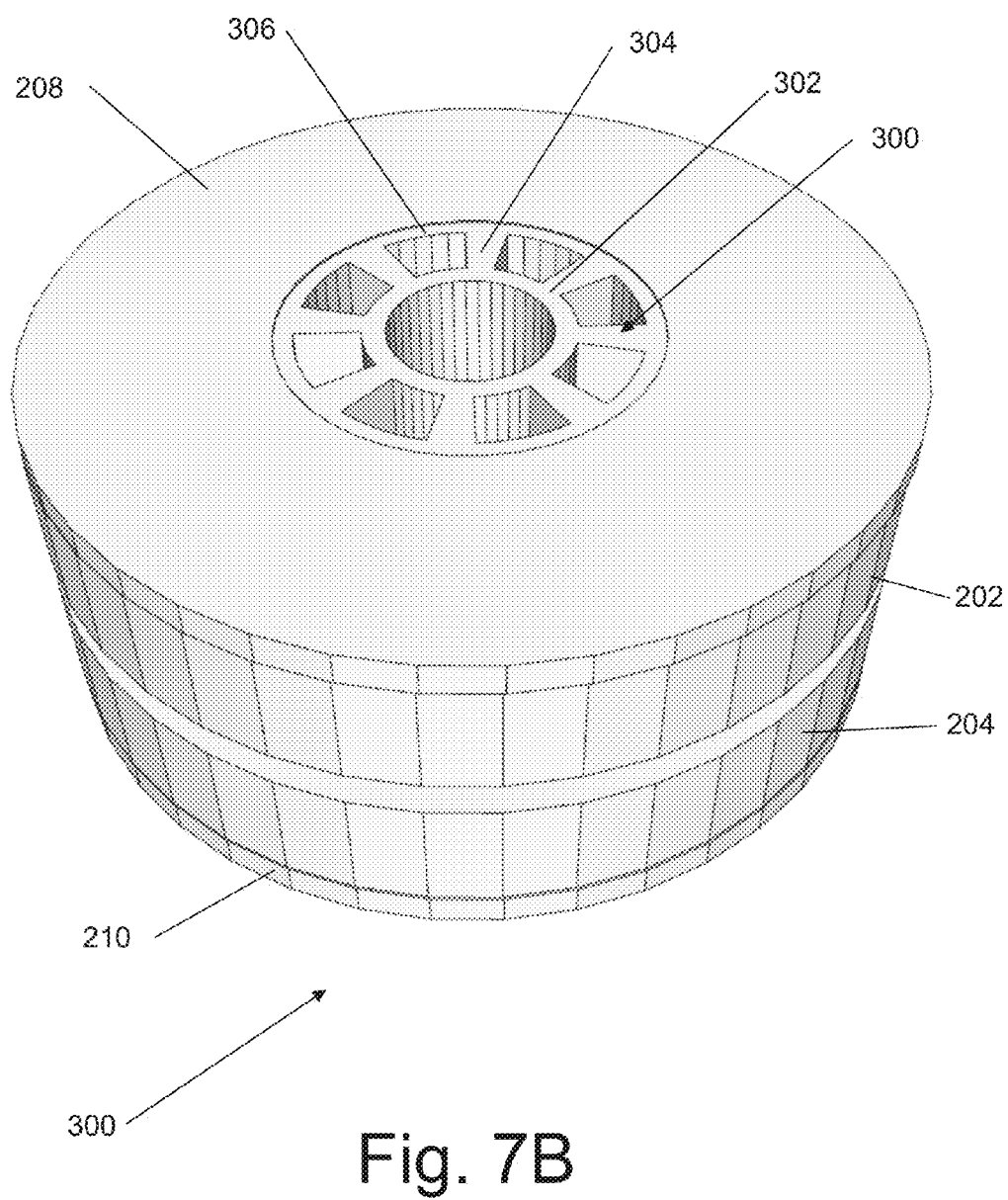
FIG. 7B illustrates the magnetic cylinder of FIG. 6C coupled to a complete back iron circuit.

FIG. 7A illustrates an eight tunnel toroidal magnetic cylinder 430 of FIG. 6C with a portion of the back iron circuit enclosing the magnetic cylinder 430. FIG. 7B illustrates the eight tunnel toroidal magnetic cylinder 430 fully enclosed by the back iron circuit. As discussed above, in other embodiments, there are slots or gaps between the back iron components to allow for the passage of control wires and conductors (not shown).

As discussed above, the hub 300 comprises an inner hub 302 for coupling to a mechanical load transferring device, such as a rod (not shown). A plurality of radial arms or spokes 304 structurally connect the inner hub 302 to an outer hub 306. In certain embodiments, the outer hub 306 also comprises a portion of the back iron circuit and thus may be formed from back iron material.

In certain embodiments, the back iron circuit may be used as part of the magnetic flux path. The back iron material channels the magnetic flux produced by the magnetic toroidal cylinder 430 through the back iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

In certain embodiments, the back iron circuit may include a "top" side or axial wall 208 and a "bottom" side or axial wall 210 of back iron material. The circuit may also include the circumferential rings 202 and 204 which may or may not couple to the axial walls 208 and 210, respectively. Thus, the entire back iron circuit includes the outer cylinder wall 306 of the hub 300, the circumferential rings 202 and 204, and the axial walls 208 and 210 as illustrated in FIGS. 7A and 7B. The back iron circuit combined with the toroidal magnetic cylinder 430 may form a rotor (or a stator depending on the motor configuration).

In order maintain the generated torque and/or power the individual coils 526 in the coil assembly may be selectively energized or activated by way of a switching or controller (not shown). The individual coils 526 in the coil assembly 500 may be electrically, physically, and communicatively coupled to switching or controller which selectively and operatively provides electrical current to the individual coils in a conventional manner.

For instance, the controller may cause current to flow within the individual coil as indicated in FIGS. 5D and 5E when the individual coil is within a magnetic tunnel segment with a NNSS magnetic pole configuration as illustrated in FIGS. 5D and 5E. On the other hand when the same individual coil moves into an adjacent magnetic tunnel segment with a SSNN magnetic pole configuration, the controller causes the current within the individual coil to flow in a direction opposite to that shown in FIGS. 5D and 5E so that the generated magnetic force is in the same direction as illustrated by the arrows 602, 604, 606, and 608 of FIG. 5E.

Turning back to FIGS. 4C and 5E, the individual coils 526 may use toroidal winding without end windings and in some embodiments be connected to each other in series. In other embodiments, a three phase winding may be used where adjacent coils are connected together to form a branch of each phase. For instance, two adjacent coils may be phase A coils, the next two adjacent coils may be phase B coils, and the next two adjacent coils may be phase C coils. This three phase configuration would then repeat for all individual coils 526 within the coil assembly. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the three phase winding can produce a rotating magnetic field in the air gap around the coil assembly. The rotating magnetic field interacts with the magnetic field generated by the toroidal magnetic tunnel producing torque and relative movement between the coil assembly and the toroidal magnetic tunnel.

In such embodiments, the individual coils 526 may be connected to a brushless motor controller (not shown) to be activated in a manner known in the art. For each phase, the controller can apply forward current, reverse current, or no current. In operation, the controller applies current to the phases in a sequence that continuously imparts torque to turn the magnetic toroidal tunnel in a desired direction (relative to the coil assembly) in motor mode. In certain embodiments, the controller can decode the rotor position from signals from position sensors or can infer the rotor position based on current drawn by each phase.

Figure 8:
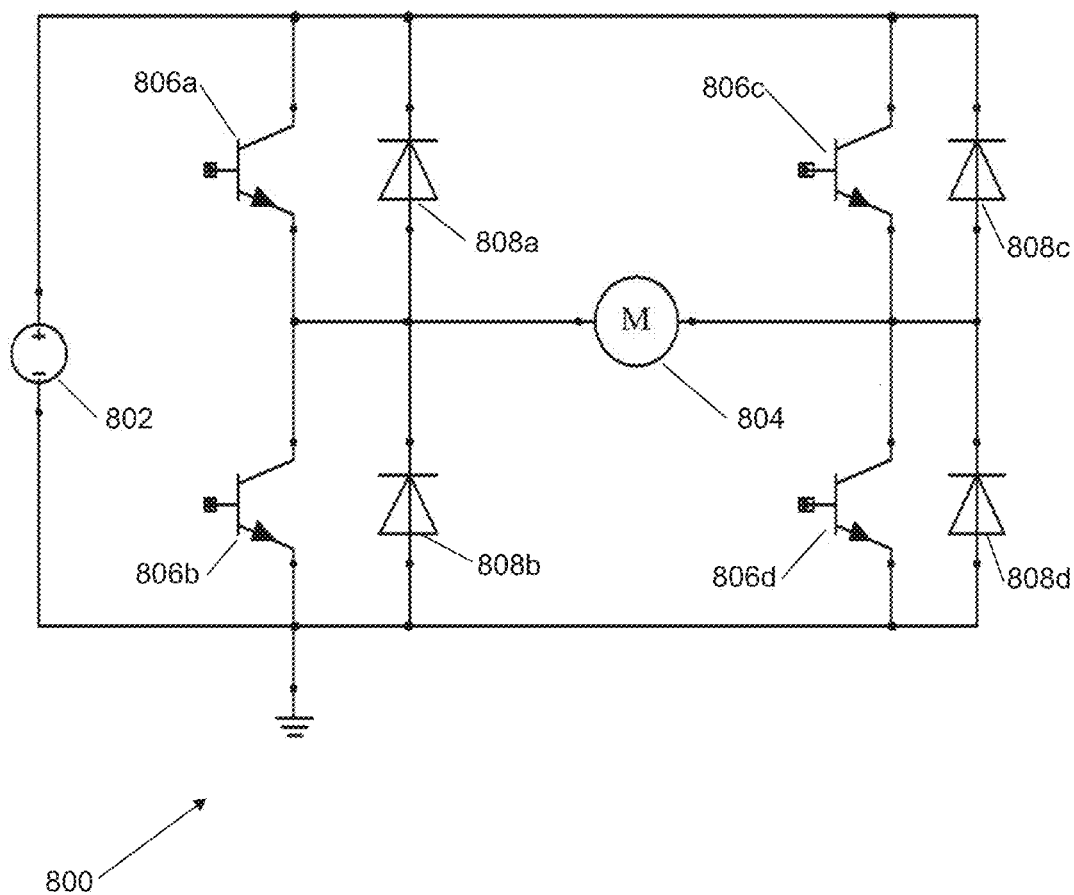
FIG. 8 illustrates an exemplary switch circuit which may be used with certain embodiments of the present invention.

In yet, other embodiments, a brushed motor/generator may be used. In such embodiments, one or more commutators (not shown) may be used and positioned, for instance, within the hub 300. In certain embodiments, the number of brushes used may equal the number of toroidal magnetic segments used in the design of the particular motor/generator. For instance, if four toroidal magnetic segments are used, then four brushes may be used. The individual coils 526 in the coil assembly may be connected in series having toroidal wound windings. In a brushed design in motor mode, a simplified switching circuit 800 such as illustrated in FIG. 8 is all that is necessary to switch the current direction as the coils enter and exit the respective toroidal magnetic segment. As illustrated in FIG. 8, a power source 802 is electrically coupled to a brushed motor 804 via four pairs of transistors 806a-806d and diodes 808a-808d as is known in the art to switch the current of the four toroidal magnetic segments.

As discussed above, surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion.

Continuous torque and continuous power, therefore, are greatly increased. Furthermore, continuous torque density, continuous power density by volume, and continuous power density by weight are also increased when compared to conventional electric motors.

Figure 9A:
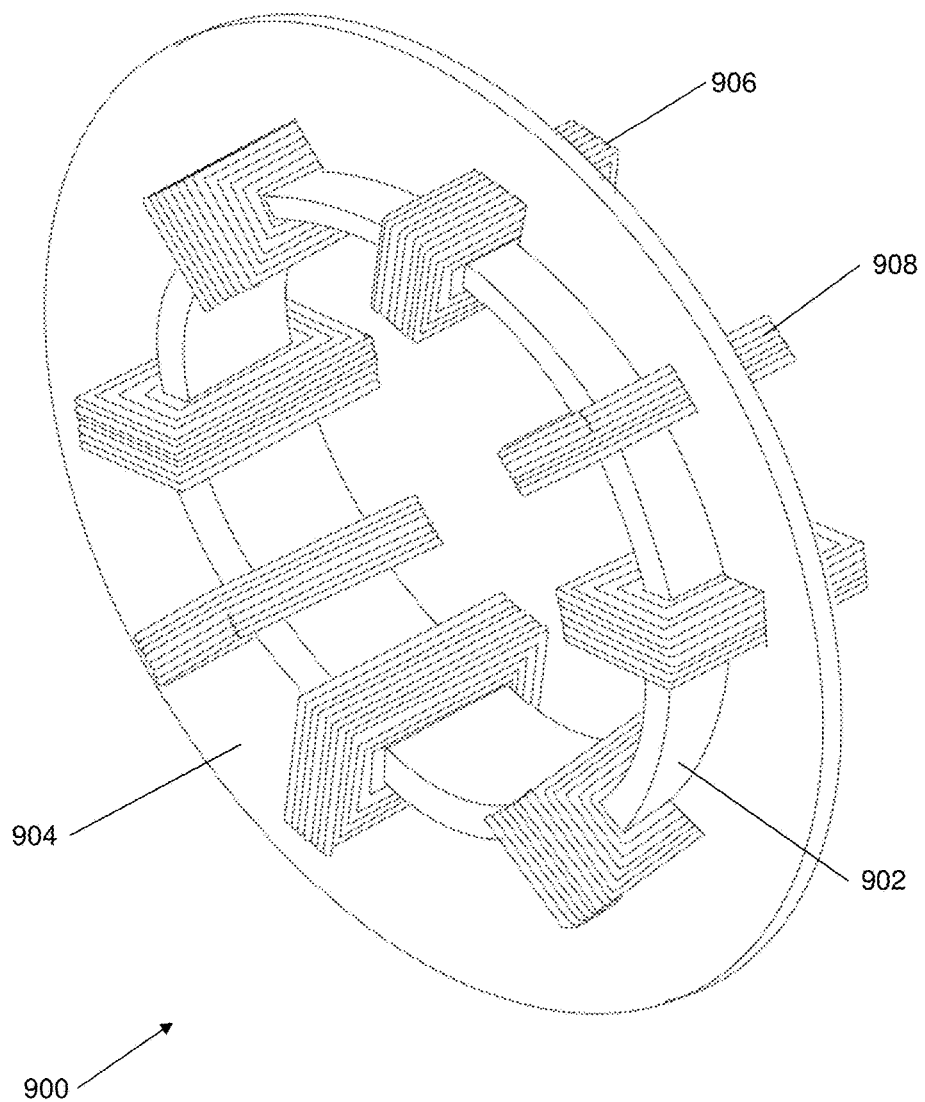
FIGS. 9a-9c illustrate various views of an exemplary coil assembly that may be used with certain embodiments of the present invention.
Figure 9B:
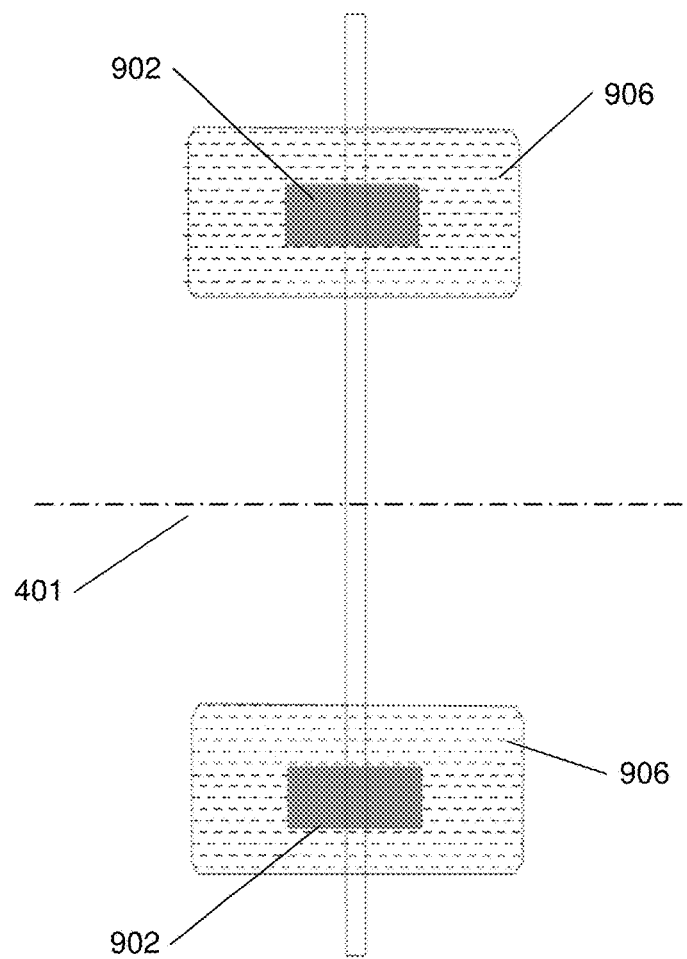

As can be seen from FIGS. 9a and 9b, the stator 900 comprises a core, such as an iron core 902, a connecting ring support assembly 904 and a plurality of coils or windings 906. The iron core 902 is conceptually similar to the core 504 discussed above in reference to FIG. 4a. The iron core 902 is coupled to the plurality of coils 906 using conventional fastening methods known in the art. (In other embodiments, the iron core 902 may consist of two or more segments which may be fastened together to form a complete ring or core. These embodiments may have the benefit of allowing the plurality of coils 906 to be built on conventional forms then added to the ring segments.) Although an iron core is used in this embodiment as a magnetic flux line concentrator, other core materials maybe used when design considerations such as mechanical strength, reduction of eddy currents, cooling channels, etc. are considered. In fact, certain embodiments may not use the central iron core 902.

Figure 9C:
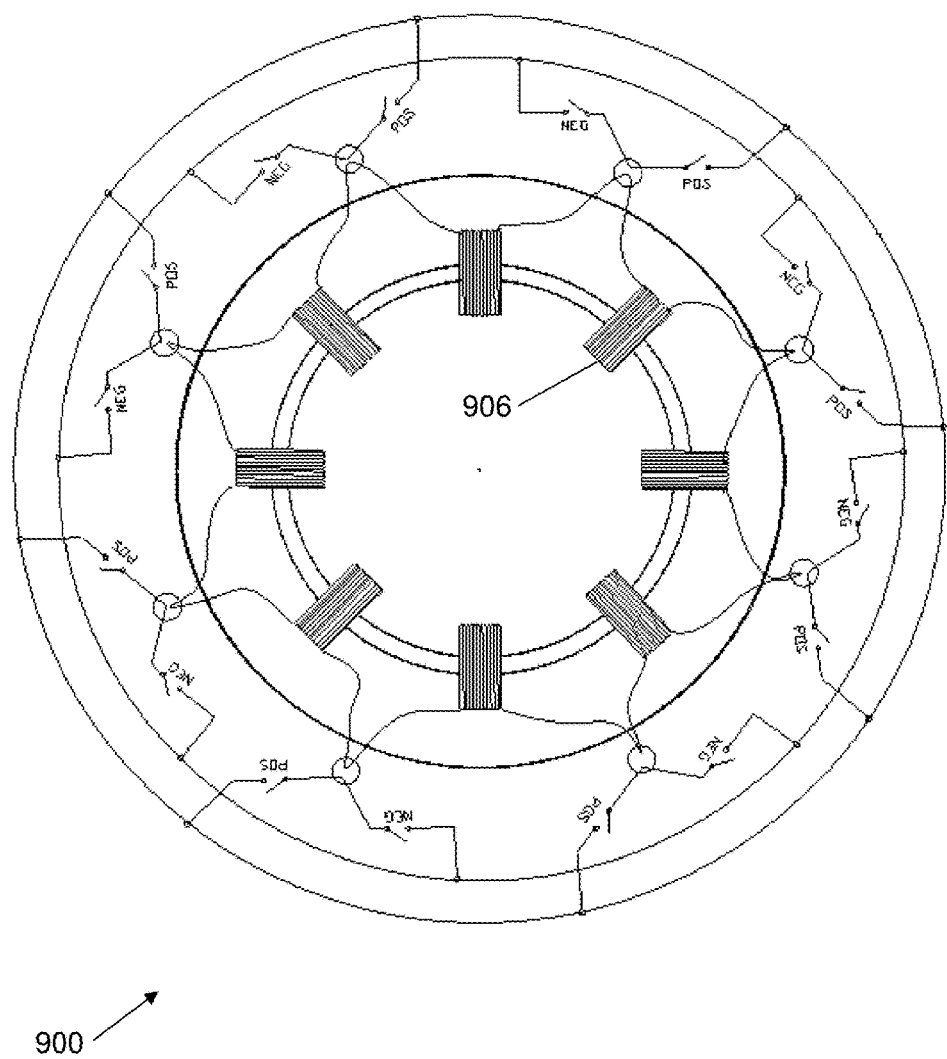

As illustrated in FIGS. 9a to 9c, the plurality of coils 906 are positioned radially about the core 902 to form a coil assembly 908. Each individual coil 906a in the coil assembly 908 may be made from a conductive material, such as copper (or a similar alloy) wire and may be constructed using conventional winding techniques known in the art. In certain embodiments, the individual coils 906a may be essentially cylindrical or rectangular in shape being wound around a coil core (not shown) having a center opening sized to allow the individual coil 906a to be secured to the core 902. The windings of each coil 906a are generally configured such that they remain transverse or perpendicular to the direction of the relative movement of the magnets comprising a rotor 910. The windings are also transverse with respect to the magnetic flux produced by the individual magnets of the rotor at their interior face as described above. Consequently, the entire winding or windings may be used to generate movement (in motor mode) or voltage (in generator mode).

The number of coils 906 can be any number that will physically fit within the desired volume and of a conductor length and size that produces the desired electrical or mechanical output as known in the art. In certain embodiments, the coils 906 may be essentially one continuous coil, similar to a Gramme Ring as is known in the art.

Figure 10:
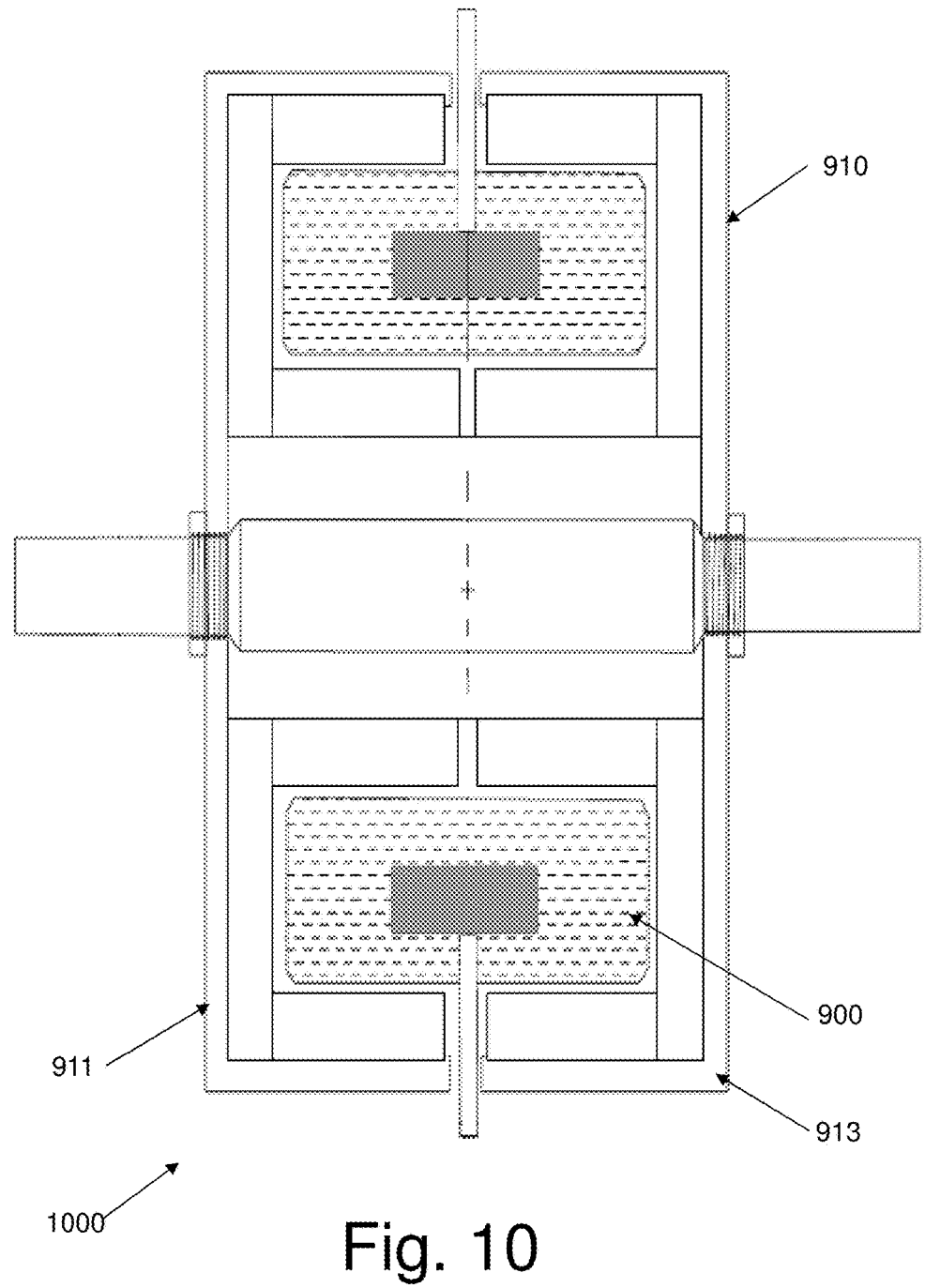
FIG. 10 is a cross-sectional view of one embodiment of an electric motor/generator assembly.

FIG. 10 is a cross-sectional view of one embodiment of an electric motor/generator assembly 1000 illustrating the stator 900 positioned within a magnetic assembly 911 and a magnetic assembly 913 of the rotor 910. The magnetic assemblies 911 and 913 are described in greater detail in previously incorporated U.S. Patent Application 62/056,389.

Figure 11A:
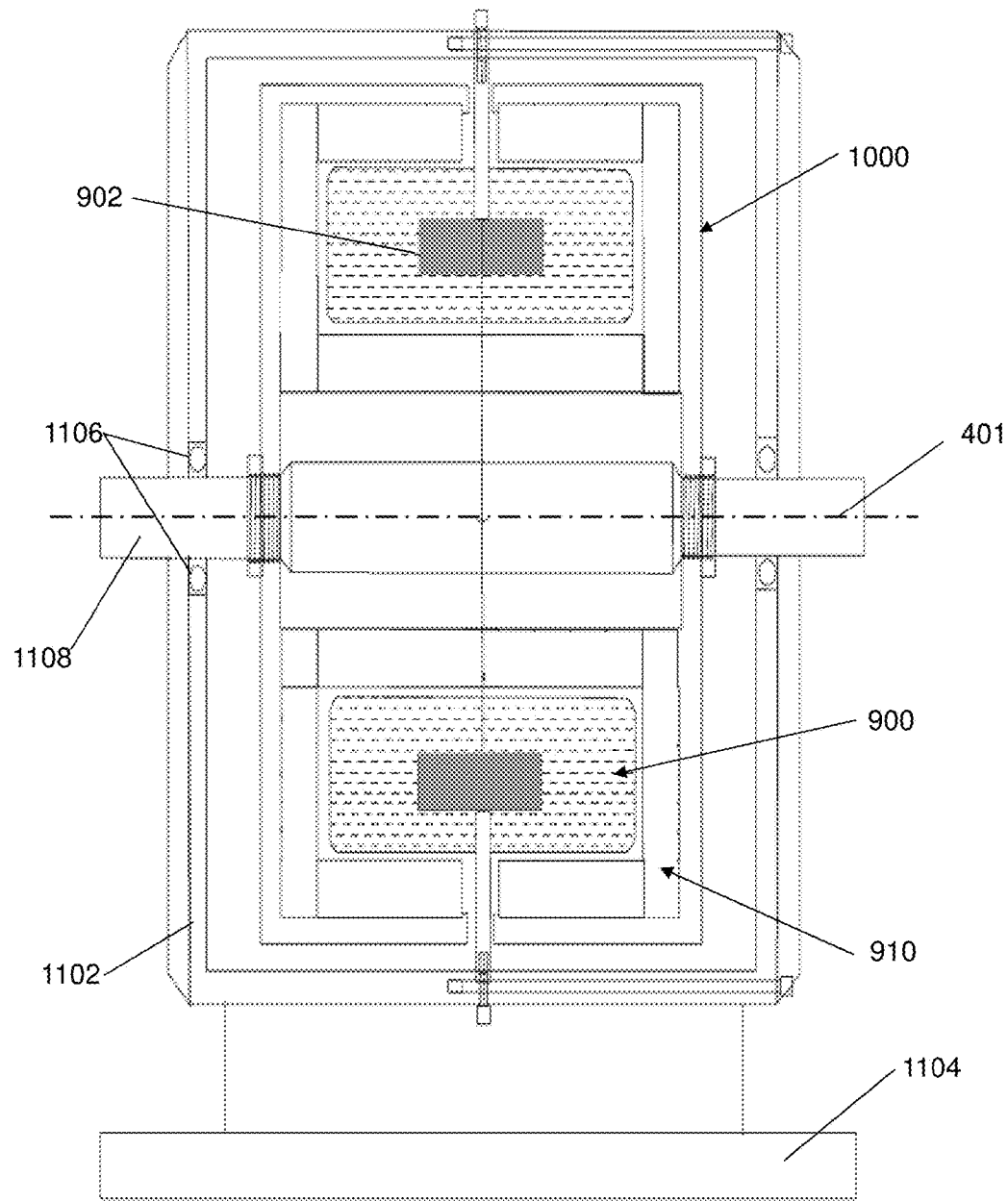
FIG. 11A is a cross-sectional view of the assembly of FIG. 10 positioned within a motor.
Figure 11B:
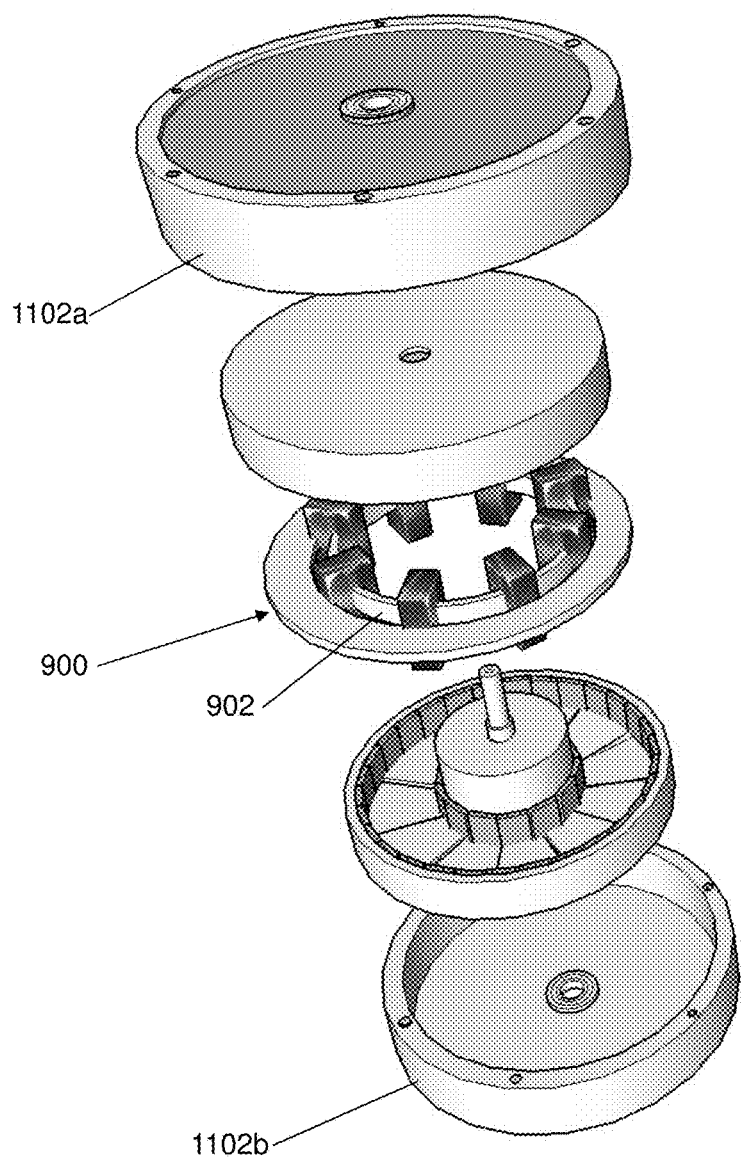
FIG. 11B is an exploded perspective view of the motor of FIG. 11A.

FIG. 11a is a cross section view of the assembly 1000 positioned within an assembled motor 1100. FIG. 11b is an exploded perspective view of the motor 1100. In certain embodiments, there may be an outer casing or housing 1102 which provides structural support for the rotor 910 and stator 900, and a longitudinal shaft 1108. In certain embodiments, the housing 1102 may be formed from any material, alloy, or compound having the required structural strength and may be actually made from two housing components. In certain embodiments, non-ferrous materials may be used as there is essentially no detectable external magnetic field from the rotor. In some embodiments, external bearings 1106 may be used to reduce the friction between the longitudinal shaft 1108 and the housing 1102 or a similar supporting structure. In certain embodiments, the housing 1102 may be coupled to a base 1104 to provide for structural support for the housing 1102. As is well known, in the art, the motor 1000 may also be coupled to a controller appropriate for the desired output from the machine (not shown).

Figure 12A:
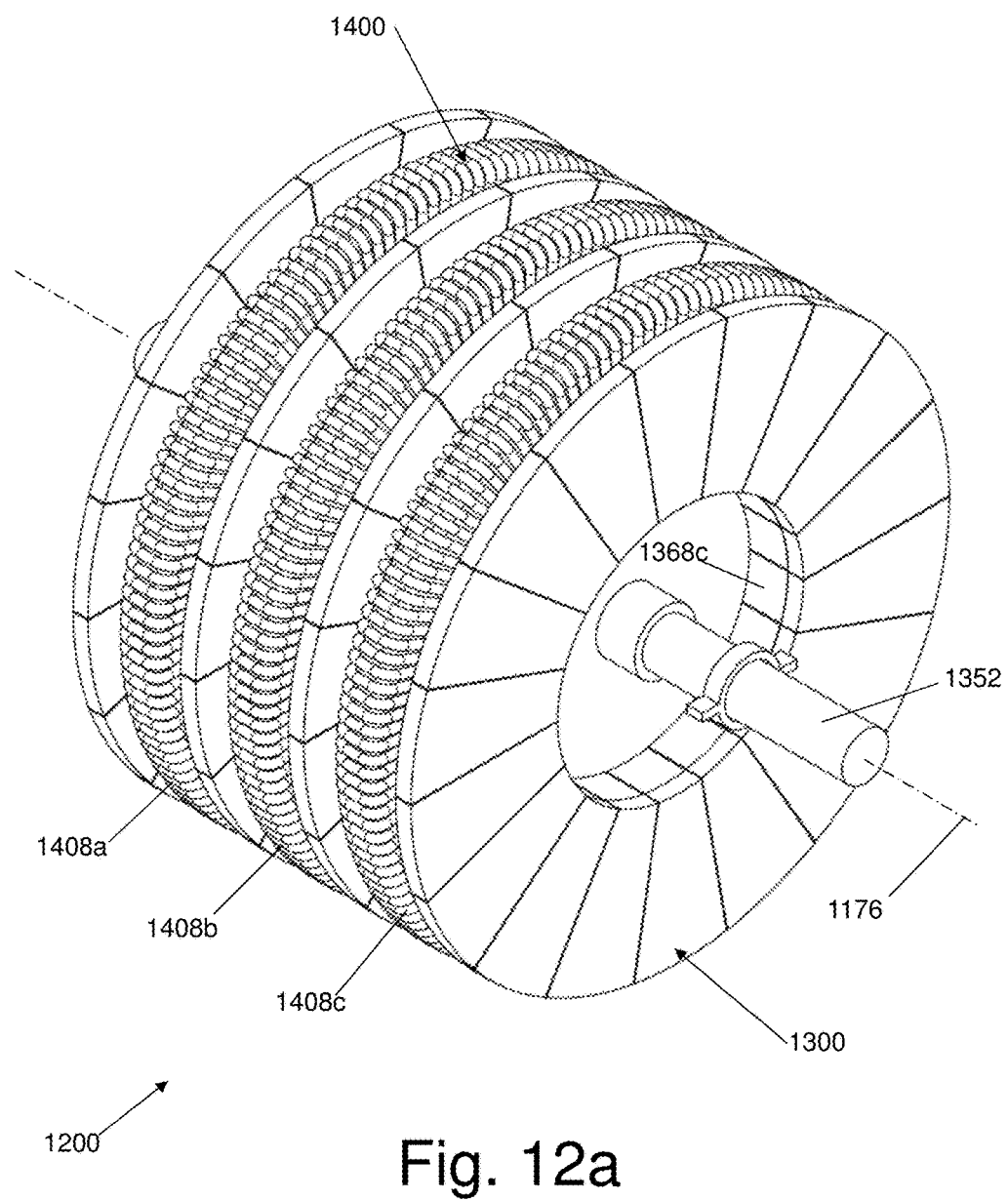
FIG. 12A is an isometric view of an alternative embodiment of an electric motor/generator assembly.
Figure 12B:
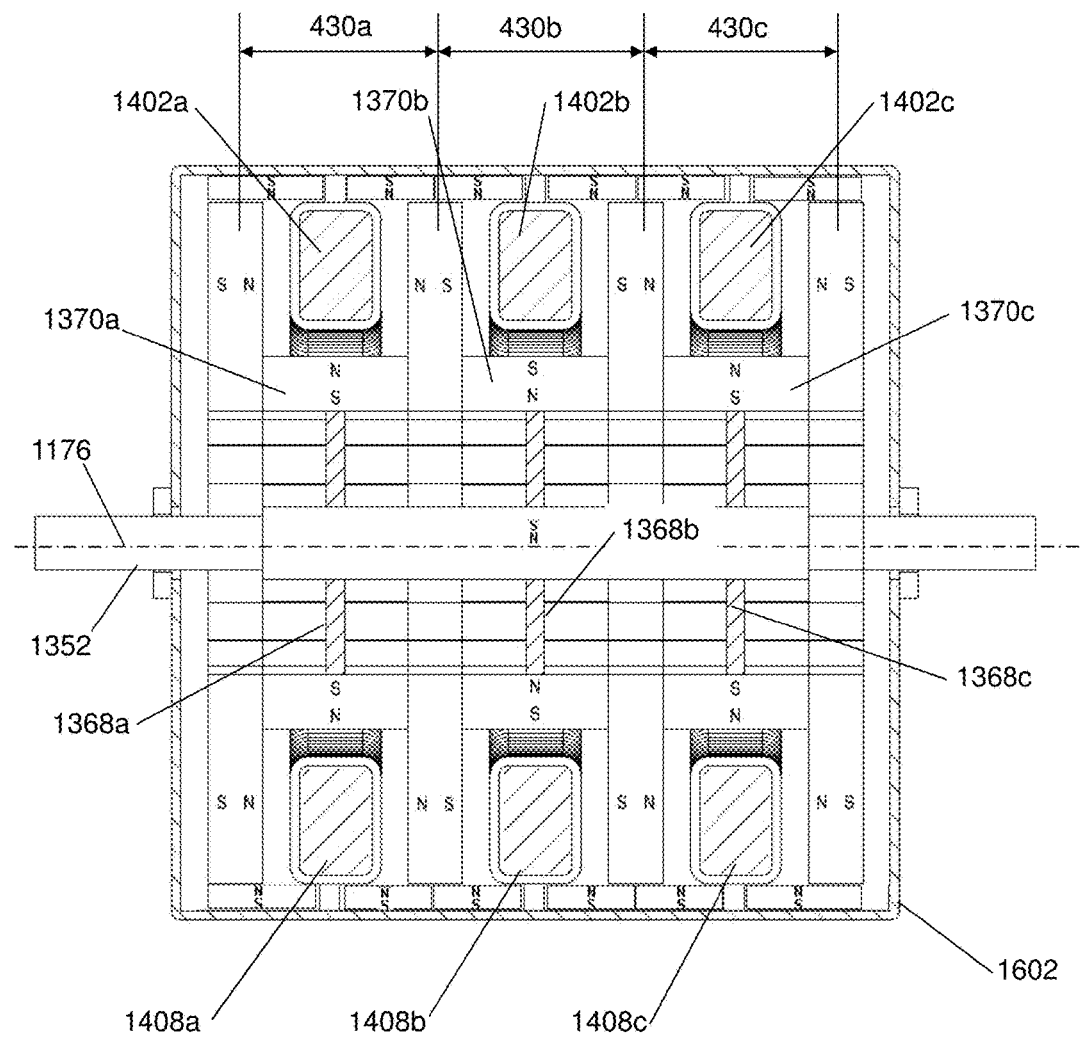
FIG. 12B illustrates the motor/generator assembly of FIG. 12A with three "magnetic cylinders."

Turning now to FIG. 12a, there is an isometric view of an alternative embodiment of an electric motor/generator assembly 1200 illustrating a stator assembly 1400 positioned within a rotor assembly 1300. FIG. 12b is a longitudinal cross-section of the electric motor/generator assembly 1200 positioned within a casing 1602 illustrating three coil assembles 1408a through 1408c of the stator assembly 1400 positioned within the magnetic assembly 1200.

In some aspects, many of these components of the cylinder assembly 1200 are assembled utilizing the toroidal or partial toroidal magnetic cylinder concepts as described above. In this embodiment, the rotor assembly 1300 is essentially three magnetic toroidal cylinders 430 (discussed above) assembled longitudinally as a single cylinder assembly (with certain polarities reversed as explained below) and on a common shaft. However, in FIG. 12a, the outer-most magnetic cylindrical wall has been removed for clarity.

In certain embodiments, conductor wrapped coil assemblies 1408a through 1408c include cores 1402a through 1402c similar to the core 902 discussed above. The cores 1402a through 1402c may be formed of iron, iron powder composite or other magnetic/non-magnetic core material. Conductive materials, such as copper wire, are individually wrapped around portions of the cores 1402a, the core 1402b, and the core 1402c to form one or more coil segments 406 for each coil assembly 1408a through 1408c.

As discussed above, multiple coils or coil segments in each coil assembly 1408a through 1408c allows speed control by selectively connecting coil segments in differing combinations of series and parallel connections without changing the system supply voltage. The number of coils can be any number that will physically fit within the desired volume and of a conductor length and size that produces the desired electrical or mechanical output as known in the art. In certain embodiments, the coils or coil segments may be essentially one continuous coil, similar to a Gramme Ring as is known in the art.

Thus, the coil assemblies 1408a through 1408c may be generally ring shape which allows for the toroidal magnetic cylinders 430a through 430c to be positioned annularly with respect to a longitudinal axis 1176. A plurality of hubs, such as hubs 1368a through 1368c couple a longitudinal shaft 1352 to the magnetic cylinders 430a through 430c.

As illustrated in FIG. 12b, the motor/generator assembly 1200 may include three "magnetic cylinders" 430a, 430b, and 430c spaced longitudinally from each other and sharing the same shaft 1352, longitudinal axis 1176 and common interior magnetic side walls. In the illustrative embodiment, the individual magnetic cylinders 430a, 430b, and 430c alternate magnetic polarities. For instance, the north pole of magnet 1370a faces outward towards the core 1402a. However, the north pole of the magnet 1370b faces inward away from the core 1402b. Similarly, the north pole of magnet 1370c faces outward towards the core 1402c. This pattern would continue if more individual magnetic cylinders were added to the motor/generator assembly 1200.

In other words, the space filled by the core 1402a for the individual magnetic cylinder 430a has a magnetic force filled with a "north pole" polarity from the positioning of the magnets facing the core 1402a. On the other hand, the space filled by the core 1402b for the individual magnetic cylinder 430b has a magnetic force filled with a "south pole" polarity from the positioning of the magnets facing the core 1402b. The space filled by the core 1402c for the individual magnetic cylinder 430c has a magnetic force filled with a "north pole" polarity from the positioning of the magnets facing the core 1402c.

In certain embodiments, the longitudinal shaft 1352 may be made from an iron, steel, or a ferrite compound with similar magnetic properties to iron. In certain embodiments, the longitudinal shaft 1352 may include a ferrite compound or powder. In some embodiments, the ferrite compound or powder may be suspended in a viscous material, such as an insulating liquid, a lubricant, motor oil, gel, or mineral oil to reduce or eliminate eddy currents and magnetic hysteresis.

In certain embodiments, there may be an outer casing or housing 1602 which provides structural support for the motor/generator assembly 1200 and the longitudinal shaft 1352. In certain embodiments, the housing 1602 may be formed from any material, alloy, or compound having the required structural strength. In certain embodiments, non-ferrous materials may be used. In some embodiments, external bearings (not shown) may be used to reduce the friction between the longitudinal shaft 1352 and the housing 1602 or a similar supporting structure. In certain embodiments, the housing 1602 may be coupled to a base (not shown) to provide for structural support for the housing.

The invention claimed is:

1. A rotary motor/generator segment comprising:
a toroidal magnetic cylinder comprising a plurality of magnetic tunnel segments radially arranged about a longitudinal axis to form a circular path, wherein the plurality of magnetic tunnel segments comprises at least:
a first closed magnetic tunnel segment comprising:
a first inner magnetic wall having a magnetic pole orientation that points generally towards an interior of the first closed magnetic tunnel segment;
a first outer magnetic wall having a magnetic pole orientation that points generally towards the interior of the first closed magnetic tunnel segment, the first outer magnetic wall positioned farther from the longitudinal axis than the first inner magnetic wall;
a first ring magnetic wall having a magnetic pole orientation that points generally towards the interior of the first closed magnetic tunnel segment and positioned to generally span a radial distance between the first inner magnetic wall and the first outer magnetic wall;
a first opposing ring magnetic wall having a magnetic pole orientation that points generally towards the interior of the first closed magnetic tunnel segment and positioned to generally span the radial distance between the first inner magnetic wall and the first outer magnetic wall;
wherein like magnetic poles of the first inner magnetic wall and the first ring magnetic wall are orientated in an opposite direction from the like poles of first outer magnetic wall and the first opposing ring magnetic wall;
a second closed magnetic tunnel segment positioned circumferentially adjacent to the first magnetic tunnel segment, the second closed magnetic tunnel segment comprising:
a second inner magnetic wall having a magnetic pole orientation that points generally towards an interior of the second closed magnetic tunnel segment;
a second outer magnetic wall having a magnetic pole orientation that points generally towards the interior of the second closed magnetic tunnel segment, the second outer magnetic wall positioned farther from the longitudinal axis than the second inner magnetic wall;
a second ring magnetic wall having a magnetic pole orientation that points generally towards the interior of the second closed magnetic tunnel segment and positioned to generally span a radial distance between the second inner magnetic wall and the second outer magnetic wall;
a second opposing ring magnetic wall having a magnetic pole orientation that points generally towards the interior of the second closed magnetic tunnel segment and positioned to generally span the radial distance between the second inner magnetic wall and the second outer magnetic wall;
wherein like magnetic poles of the second inner magnetic wall and the second ring magnetic wall are orientated in an opposite direction from the like poles of second outer magnetic wall and the second opposing ring magnetic wall;
wherein the magnetic poles of the magnetic walls comprising the second closed magnetic tunnel segment are orientated in a direction opposite to the magnetic poles of the magnetic walls comprising the first closed magnetic tunnel segment;
a coil assembly positioned within the circular path, the coil assembly comprising:
a ring-like core;
a plurality of teeth radially positioned about the ring-like core and extending from the ring-like core to form a plurality of slots;
a plurality of coil windings wherein each coil winding in the plurality of winding is positioned within a slot within the plurality of slots.

2. The rotary motor/generator segment of claim 1, wherein material forming the plurality of magnetic tunnel segments is selected from the group consisting of iron, magnetic steel, or laminated steel.

3. The rotary motor/generator segment of claim 1, wherein the first inner magnetic wall, the first outer magnetic wall, the first ring magnetic wall and the first opposing ring magnetic wall may be formed from electromagnets.

4. The rotary motor/generator segment of claim 1, wherein the second inner magnetic wall, the second outer magnetic wall, the second ring magnetic wall and the second opposing ring magnetic wall may be formed from electromagnets.

5. The rotary motor/generator segment of claim 1, further comprising a back iron circuit surrounding the plurality of magnetic tunnel segments.

6. The rotary motor/generator segment of claim 1, further comprising a shaft concentrically positioned about the longitudinal axis.

7. The rotary motor/generator segment of claim 1, wherein substantially all of the wire windings in an individual coil is substantially positioned within a magnetic field created by the first magnetic tunnel segment when the individual coil is positioned within the magnetic tunnel segment.

8. The rotary motor/generator segment of claim 1, wherein a magnetic field generated by the inner magnetic wall and a current flowing within wire windings in an adjacent coil creates a tangential magnetic force in a direction of relative movement between the magnetic cylinder and the coil assembly.

9. The rotary motor/generator segment of claim 1, wherein the magnetic field generated by the outer magnetic wall and a current flowing within wire windings in an adjacent coil creates a tangential magnetic force in a direction of relative movement between the magnetic cylinder and the coil assembly.

10. The rotary motor/generator segment of claim 1, wherein the magnetic field generated by the first ring magnetic wall and a current flowing within wire windings in an adjacent coil creates a tangential magnetic force in a direction of relative movement between the magnetic cylinder and the coil assembly.

11. The rotary motor/generator segment of claim 1, wherein the magnetic field generated by the opposing ring magnetic wall and a current flowing within wire windings in an adjacent coil creates a tangential magnetic force in a direction of relative movement between the magnetic cylinder and the coil assembly.

12. The rotary motor/generator segment of claim 1, wherein a tangential magnetic force is generated on all sides of individual coils in the plurality of coils when the individual coil is positioned within the first closed magnetic tunnel segment or second closed magnetic tunnel segment.

13. The rotary motor/generator segment of claim 1, wherein the plurality of tunnel segments includes a third closed magnetic tunnel segment and a fourth closed magnetic tunnel segment wherein the magnetic poles of the magnetic walls comprising the third closed magnetic cylinder segment are orientated in a direction opposite to the magnetic poles of the magnetic walls comprising the fourth closed magnetic tunnel segment.

14. The rotary motor/generator segment of claim 13, wherein the plurality of tunnel segments includes a fifth closed magnetic tunnel segment and a sixth closed magnetic tunnel segment wherein the magnetic poles of the magnetic walls comprising the fifth closed magnetic cylinder segment are orientated in a direction opposite to the magnetic poles of the magnetic walls comprising the sixth closed magnetic tunnel segment.

15. The rotary motor/generator segment of claim 14, wherein the plurality of tunnel segments includes a seventh closed magnetic tunnel segment and an eighth closed magnetic tunnel segment wherein the magnetic poles of the magnetic walls comprising the seventh closed magnetic cylinder segment are orientated in a direction opposite to the magnetic poles of the magnetic walls comprising the eighth closed magnetic tunnel segment.

* * * * *